US008341008B2

(12) United States Patent
Oku

(10) Patent No.: US 8,341,008 B2
(45) Date of Patent: Dec. 25, 2012

(54) DEMAND FORECASTING METHOD, SYSTEM AND COMPUTER READABLE STORAGE MEDIUM

(75) Inventor: Takenori Oku, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1510 days.

(21) Appl. No.: 11/602,498

(22) Filed: Nov. 21, 2006

(65) Prior Publication Data

US 2007/0118421 A1 May 24, 2007

(30) Foreign Application Priority Data

Nov. 21, 2005 (JP) ................................. 2005-335531

(51) Int. Cl.
*G06Q 10/00* (2012.01)
(52) U.S. Cl. ...................................................... 705/7.31
(58) Field of Classification Search .................. 705/7.31
See application file for complete search history.

(56) References Cited

U.S. PATENT DOCUMENTS

| 6,978,249 | B1 * | 12/2005 | Beyer et al. | ................... | 705/7.31 |
| 2002/0143604 | A1 * | 10/2002 | Cox et al. | ......................... | 705/10 |
| 2003/0225654 | A1 * | 12/2003 | Chavas et al. | ................... | 705/36 |
| 2006/0106664 | A1 * | 5/2006 | Peters et al. | ..................... | 705/10 |

FOREIGN PATENT DOCUMENTS

JP    2004-234471   *   8/2004

OTHER PUBLICATIONS

Power management of enterprise storage systems by Gurumurthi, Sudhanva, Ph.D., The Pennsylvania State University, 2005 , 138 pages; AAT 3193188.*

* cited by examiner

*Primary Examiner* — Romain Jeanty
*Assistant Examiner* — Luis Santiago
(74) *Attorney, Agent, or Firm* — Morrison & Foerster LLP

(57) ABSTRACT

Disclosed are a demand forecasting method, a demand forecasting program, and a demand forecasting system that can adequately forecast a demand for a commodity. A management computer calculates a trend function with respect to demand values. The management computer then calculates the ratio of the demand values to a trend curve, and calculates a logarithm of the ratio. Then, the management computer approximates the calculated natural logarithm curve with a periodic model, and converts the logarithmic scale of the acquired periodic model to a normal scale. Demand forecasting is performed using a demand forecasting model acquired by combining a periodic change model of the normal scale with a trend curve (trend function).

7 Claims, 22 Drawing Sheets

DEMAND FORECASTING METHOD, SYSTEM AND COMPUTER READABLE STORAGE MEDIUM

BACKGROUND OF THE INVENTION

1. Field of the Invention

The present invention relates to a demand forecasting method, system, and computer readable storage medium, and, more particularly, to demand forecasting system, and computer readable storage medium, with periodic fluctuation in consideration.

2. Description of the Related Art

Supplying commodities to a customer requires adequate inventory management of the commodities. Adequate commodity inventory management can suppress an inventory loss due to excessive inventory and opportunity loss originating from inventory deficiency.

A demand forecasting method and a demand forecasting program which can efficiently and adequately forecast a demand for a commodity, are disclosed in, for example, Unexamined Japanese Patent Application KOKAI Publication No. 2004-234471. According to the technique described in the Japanese publication, a management computer calculates a trend function based on the trend of demands (demand trend) by applying a growth model to an accumulation trend of the demands. Next, the management computer calculates the difference trend, which is the trend of a difference between the demand trend and the trend function. The management computer then calculates the periodic tune intensity of the difference trend using a Periodgram. When a periodicity is determined based on the tune intensity, the management computer approximates the difference between the demand trend and the trend function using a periodic function. The periodic function is calculated from a quadratic sine function comprising a quadratic function and a trigonometric function. The management computer then performs demand forecasting using a periodic function which is the combination of the trend function and the periodic function.

However, the technique described in the Japanese publication has the following problem. The trend function based on the Weibull growth model does not take negative values, while the periodic function based on the quadratic sine model may result in negative demand forecasting. Specifically, as shown in FIG. 22, when the level of the periodic function on the negative side exceeds the trend function, demand forecasting becomes negative.

The technique described in the Japanese publication has the following additional problem. When a commodity has been supplied over a very long period of time, there may not be a record of demand data since the time the commodity was first supplied. In such a case, demand forecasting is done based on the latest demand trend. A curve representing the trend function in that case may have a descending curve (ie., the amplitude descends with time) as shown in FIG. 23A. For a trend function having such a descending curve, the influence of the quadratic function of the quadratic sine model may cause the amplitude of the curve representing the demand forecasting model to forecast a larger value, as shown in FIG. 23B (in this case, forecast values appear on the right hand side after the vertical line at month 60).

With the quadratic sine function in use, when the positive/negative sign of the curve representing the quadratic function changes, the period may be shifted. That is, when the positive/negative sign of the curve representing the quadratic function is inverted, as shown in FIG. 24, the multiplication of the absolute value of the quadratic function and the sine function causes the phase to be shifted. This may result in unnatural forecasting.

Further, seasonal changes bring about cases that show features unique to commodities. For example, as shown in FIGS. 25A to 25C, the demanded quantity has peaks in some specific months. There is a case where the shapes of repetitive peaks are almost the same. When the sine function described in the Japanese publication is used, however, such features unique to commodities cannot be expressed. There is a demand for a seasonal change forecasting model capable of coping with such a change as having peak demand values only in specific months.

The invention has been made to overcome the problems. It is an object of the invention to provide a demand forecasting method, system, and computer readable storage medium, which can efficiently and adequately forecast a demand in consideration of a periodic change of a predetermined commodity.

SUMMARY OF THE INVENTION

To overcome the problems, according to the first aspect of the invention, there is provided a demand forecasting method that forecasts a demand for a product using a demand data storage unit recording a demand trend comprising a time-sequential trend of a demand value of the product, and a management computer, the management computer including a trend-function calculating stage that calculates a trend function based on the demand trend recorded in the demand data storage unit; a demand-trend ratio calculating stage that calculates a demand trend ratio which is a ratio of the demand trend to the trend function; a periodic-model calculating stage that calculates a periodic model which approximates the demand trend ratio; and a demand-forecast calculating stage that calculates a demand forecast value of the product by calculating a demand forecasting model by multiplication of the periodic model by the trend function.

In the demand forecasting method of the first aspect of the invention, in the periodic-model calculating stage, a logarithm of the demand trend ratio may be calculated, and a periodic function approximating the logarithm may be calculated as the periodic model.

In the demand forecasting method of the first aspect of the invention, in the periodic-model calculating stage, values from the demand trend ratio obtained at the demand trend ratio calculating stage, are selected at an interval expected to express a periodicity of the demand for commodity, and the periodic model is obtained by calculating statistic values representing the selected demand trend ratio values.

According to the second aspect of the invention, there is provided a computer readable storage medium that stores a demand forecasting program which forecasts a demand for a commodity by allowing a management computer having a demand data storage unit recording a demand trend comprising a time-sequential trend of a demand value of the commodity to function as a trend-function calculator that calculates a trend function based on the demand trend recorded in the demand data storage unit; a demand-trend ratio calculator that calculates a demand trend ratio which is a ratio of the demand trend to the trend function; a periodic-model calculator that calculates a periodic model which approximates the demand trend ratio; and a demand-forecast calculator that calculates a demand forecast value of the commodity by calculating a demand forecasting model by multiplication of the periodic model by the trend function.

In the demand forecasting program according to the second aspect of the invention, in the periodic-model calculator, a logarithm of the demand trend ratio can be calculated, and a periodic function approximating the logarithm can be calculated as the periodic model.

In the demand forecasting program according to the second aspect of the invention, in the periodic-model calculator, values from the demand trend ratio obtained by the demand trend ratio calculator, are selected at an interval expected to express a periodicity of the demand for commodity, and the periodic model is obtained by calculating statistic values representing the selected demand trend ratio values.

According to the third aspect of the invention, there is provided a demand forecasting system that forecasts a demand for a commodity using a demand data storage unit recording a demand trend comprising a time-sequential trend of a demand value of a demanded quantity of the commodity, and a management computer, the management computer comprising a trend-function calculator that calculates a trend function based on the demand trend recorded in the demand data storage unit; a demand-trend ratio calculator that calculates a demand trend ratio which is a ratio of the demand trend to the trend function; a periodic-model calculator that calculates a periodic model which approximates the demand trend ratio; and a demand-forecast calculator that calculates a demand forecast value of the commodity by calculating a demand forecasting model by multiplication of the periodic model by the trend function.

According to the invention, a trend function is calculated based on the demand trend recorded in the demand data storage unit and comprising the time-sequential trend of demand values. The demand trend ratio of the demand trend to the acquired trend function is calculated, and a periodic model which approximates the demand trend ratio is calculated. Generally speaking, as the amplitude of the trend function becomes greater, the amplitude of the periodicity tends to get greater. With the use of the demand trend ratio, however, the periodic model should take only periodicity into account. This ensures better approximation.

According to one mode of the invention, a logarithm of the demand trend ratio is calculated, and a periodic function approximating the logarithm is calculated as the periodic model. Even when "demand value>trend value" and when "demand value<trend value", both cases can be expressed symmetrically on logarithmic coordinates. This makes it easier to adapt the periodic function.

According to another mode of the invention, the demand trend ratio is acquired, and statistic values representing the acquired demand trend ratio are calculated at an interval expected to express the periodicity of the commodity. The calculated statistic values are used as a periodic model. Even when a demand trend cannot be expressed by a simple periodic function, a periodic table can be acquired, and demand forecasting can be executed using the periodic table.

According to the invention, a demand can be forecast efficiently and adequately in consideration of a periodic change in the demand of a commodity.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS (First Embodiment)

One embodiment of a demand forecast process embodying the present invention will be described below with reference to FIGS. 1 to 11. In the embodiment, demand forecasting for service parts as commodities is carried out with a periodic function applied to a trend function under a given condition. Specifically, the embodiment will be explained as a demand forecasting method, a demand forecasting program and a demand forecasting system, which use the demand values (the number of orders received), of service parts as the actual number of products supplied to customers, and are used in a case of forecasting demands for service parts based on the time-sequential trend (demand trend) of the demands. A "service part" is a part which is to be replaced with a new one due to consumption, malfunction, etc, and which involves a service work. A part is the minimum unit to keep the function of a product. A service part includes not only a part itself, but also a unit having a combination of parts.

Figure 1:
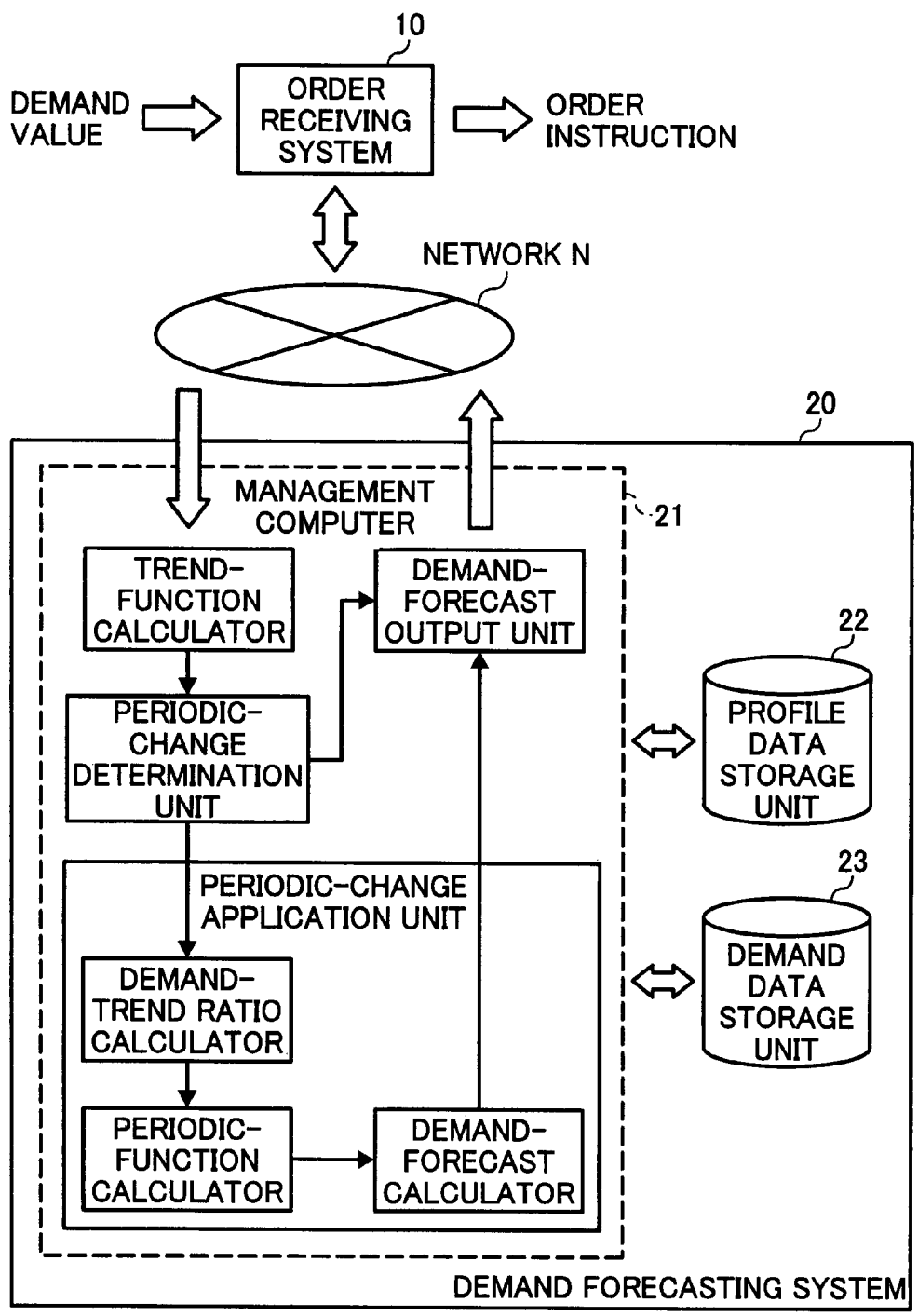
FIG. 1 is a schematic system diagram of one embodiment of the present invention.

In the embodiment, as shown in FIG. 1, a demand value is input using an order receiving system 10. An order instruction is given based on demand forecast output to the order receiving system 10. The order receiving system 10 is sited in a service parts management division where service parts are managed, accepts demand values from a sales point, a service point, etc., and outputs an order instruction to a production division, a purchase division and so forth.

The order receiving system 10 is a computer terminal having a function of transmitting data over a network N and a function of displaying received data. The order receiving system 10 has an input unit, such as a keyboard and a mouse, and output unit, such as a display, and a communication unit, such as a communication interface, in addition to a CPU, RAM and ROM (non shown).

The order receiving system 10 is connected to a demand forecasting system 20 over the network N as shown in FIG. 1. The demand forecasting system 20 is a computer system which performs various data processing relating to demand forecasting. The demand forecasting system 20 has a management computer 21.

Figure 26:
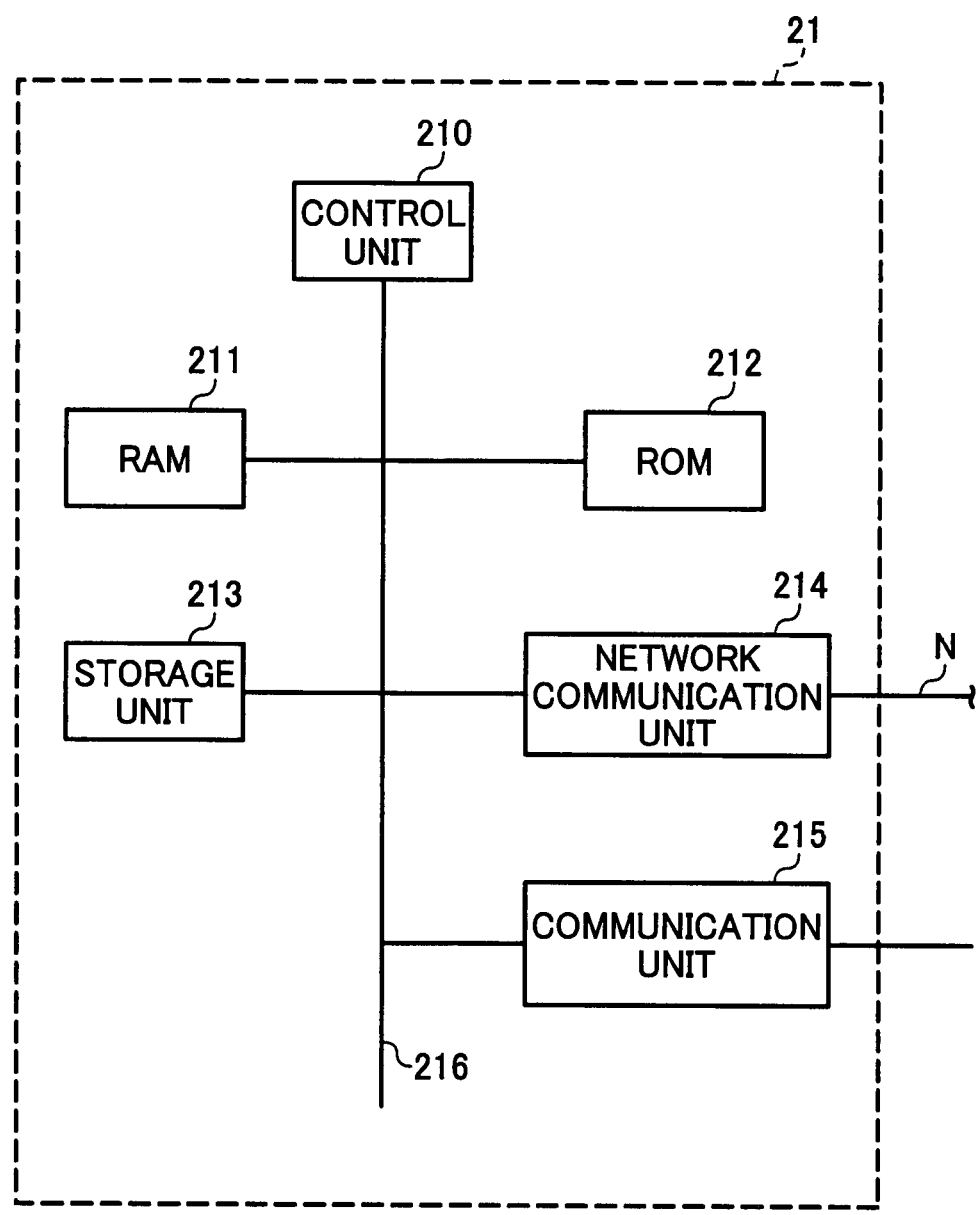
FIG. 26 is a schematic diagram of a management computer.

The management computer 21 performs data transmission/reception to/from the order receiving system 10, and management process on various data to perform demand forecasting. As shown in FIG. 26, the management computer 21 has a control unit 210, a RAM (Random Access Memory) 211, a ROM (Read Only Memory) 212, a storage unit 213, a network communication unit 214, a communication unit 215, and a bus 216.

The control unit 210 comprises a CPU (central processing unit), etc., and controls the function of the entire management computer 21 by executing the program stored in the ROM 212, and the storage unit 213, both to be described later, by using the RAM 211, also to be described later, as its working area.

The RAM (Random Access Memory) 211, is a volatile memory that temporarily stores data necessary for the control unit 210 to perform its processes.

The ROM (Read Only Memory) 212 is a nonvolatile memory that stores programs that control the basic functions of the management computer 21.

The storage unit 213, comprises a hard disk drive, and stores programs that control the management computer 21 to have the various functions that are to be presented later. The programs may be stored in the ROM 212, instead of the storage unit 213.

The network communication unit 214 has a network communication interface and communicates with the order receiving system 10 via the network N.

The communication unit 215 is a communication interface that communicates with the storage units 22 and 23, to be described later.

The bus 215 is a pathway for transmitting instructions and data between the control unit 210, the RAM 211, the ROM 212, the storage unit 213, network communication unit 214, and the communication unit 215.

The management computer 21 performs processes that include trend-function calculating stage, demand-trend ratio calculating stage, periodic-model calculating stage, and demand-forecast calculating stage, as shown in FIG. 1. Specifically, by executing a demand forecasting program in the storage unit 213, the management computer 21 functions as a trend-function calculator, a periodic-change determination unit, a periodic-change application unit, a demand-forecast output unit, and so forth. The trend-function calculator calculates a trend function based on a demand trend recorded in a demand data storage unit. The periodic-change determination unit determines whether the demand trend has a periodicity. The demand-forecast output unit supplies the results of calculations done by the trend-function calculator and the periodic-change application unit to the order receiving system 10.

Further, the periodic-change application unit functions as a demand-trend ratio calculator, a periodic-model calculator, and a demand-forecast calculator. The demand-trend ratio calculator calculates the ratio of a demand trend to a trend function (demand trend ratio). The periodic-model calculator calculates a periodic model which approximates the demand trend ratio. The demand-forecast calculator calculates a demand forecasting model by multiplying the periodic model by the trend function, thereby yielding a demand forecast value for a commodity.

Figure 2:
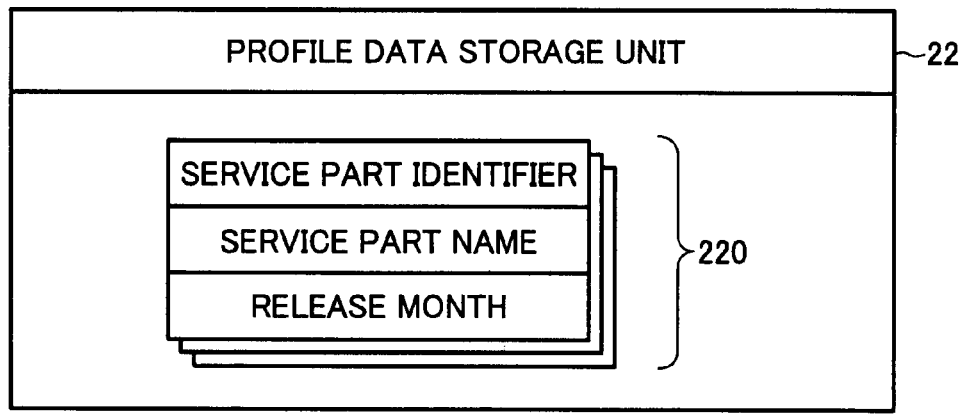
FIG. 2 is a diagram showing a structural example of data stored in a profile data storage unit.

The demand forecasting system 20 further has a profile data storage unit 22, and a demand data storage unit 23. Stored in the profile data storage unit 22 is profile data 220 relating to service parts to be subjected to demand forecasting, as shown in FIG. 2. The profile data 220 is set when service parts become available. The profile data 220 includes data on a service part identifier, a service part name and a release month for each service part.

Data on an identifier to specify a service part is recorded in a service-part-identifier data field. For example, a part number, etc., is used as the service part identifier.

Data on the name of a service part is recorded in a service-part-name data field.

Data on a date at which a service part identifier is released (open) to individual service points to supply the associated service part is recorded in a release-month data field.

Figure 3:
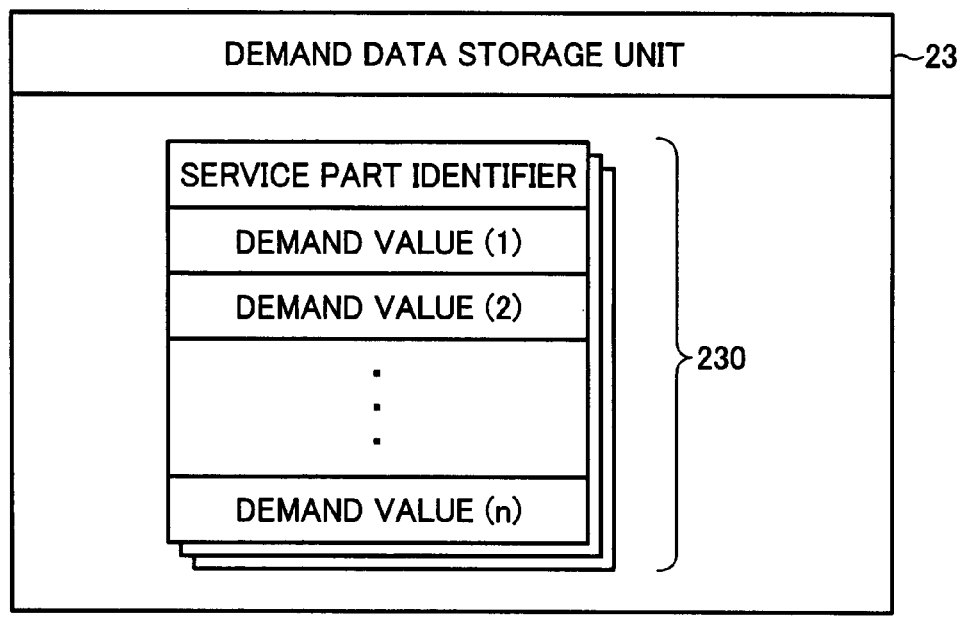
FIG. 3 is a diagram showing a structural example of data stored in a demand data storage unit.

As shown in FIG. 3, demand data 230 on each service part is recorded in the demand data storage unit 23. The demand data 230 is set after the service part identifier is released, and is additionally recorded when a demand value is fixed and is received from the order receiving system 10. The demand data 230 has, for each service part, the service part identifier and data on the demand value recorded in association with each other.

Data on an identifier to specify a service part whose demand value has been received is recorded in the service-part-identifier data field. Data on demands of a service part is recorded, together with data on a demand-received month, as the demand value of a supplied commodity, in a demand data field. In the embodiment, the demand value is recorded month by month, and constitutes a demand trend. The demand value is additionally recorded in the demand data field when a demanded quantity is settled. Therefore, the number of demand values (n) differs depending on a release month, and the number of data corresponding to the number of demand values is recorded.

Note that the demand forecasting system 20 does not have to comprise different storage units 22 and 23, to store the profile data 220 and the demand data 230. The profile data storage unit 22 and the demand data storage unit 23 may be combined, constituting one large storage unit, or the profile data 220 and the demand data 230 may be stored in storage unit 213 of the management computer 21.

Process procedures when thus constituted system performs demand forecasting of service parts will be explained referring to FIGS. 4 to 9. The same technique as described in Unexamined Japanese Patent Application KOKAI Publication No. 2004-234471 is used except for the process of applying a periodic-change model.

First, the management computer 21 determines whether or not the Weibull growth model is applicable based on the attributes of a service part as a commodity. In the embodiment, a demand period (a period in which demand values were obtained), presence/absence of a peak and flowability are used as attributes as will be described later.

Figure 4:
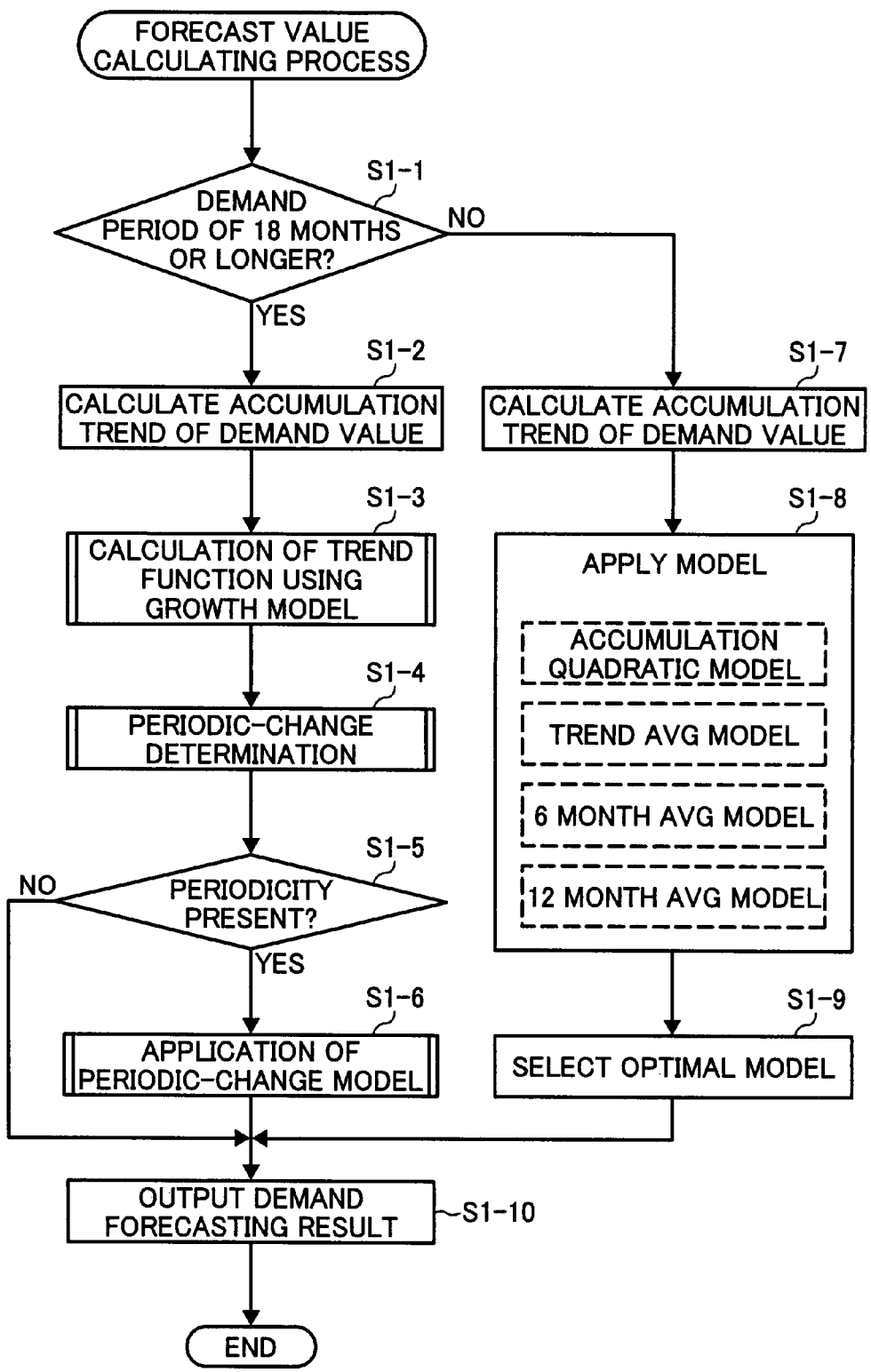
FIG. 4 is a flowchart of process procedures according to the embodiment.

As shown in FIG. 4, the management computer 21 changes processes according to the demand period of a service part. In the embodiment, different processing methods are used depending on whether the demand period is equal to or greater than 18 months (step S1-1). The Weibull growth model used in demand forecasting in the embodiment is a scheme to forecast the next quantity to be demanded from past demand values. The application of the Weibull growth model requires a certain length of a demand period. Accordingly, the management computer 21 specifies a demand period of a service part subject to forecasting, from the release month recorded in the profile data storage unit 22.

(Process for Demand Period of 18 Months or Longer)

When the demand period is 18 months or longer (step S1-1: YES), the management computer 21 calculates the accumulation trend of demand values (step S1-2). In the embodiment, the accumulation trend is calculated from all the demand values. Accordingly, the management computer 21 extracts past demand values from the demand data storage unit 23. In the embodiment, it is assumed that there are demand values for 60 months. The monthly accumulation trend is calculated by adding a demand value of each month to the total accumulated value of the previous month.

Next, the management computer 21 performs a process of calculating a trend function representing a demand trend by using the Weibull growth model (step S1-3). The trend function calculating process will be explained referring to FIG. 5. First, the management computer 21 performs a peak determination process (step S2-1). The peak determination process will be described referring to FIG. 6. A component analysis is performed on the demand trend over the past 60 months to determine whether the demand value has already passed a maximum (peak) or not. Here, 60 months is set as a reference period for peak determination process. Specifically, the management computer 21 performs predetermined weighting on the demand values of individual months, and obtains the total thereof to calculate components 1 and 2. In this case, the combination of factor load amounts ($L1(i)$, $L2(i)$) to be used in the weighting, give different meanings to the indexes of the components.

In the process, a demand value at and after the time when the demand value becomes a predetermined amount ("1" in this case) or greater, is used. When the demand period of a service part is less than 60 months, the management computer 21 generates an extended trend, in which the demand period recorded in the demand data storage unit 23 is stretched out to 60 months. The management computer 21 estimates the demanded quantity by reassigning the extended trend to individual months.

First, the management computer 21 standardizes the demand values (step S3-1). Here, a standardized demand value $Yn(i)$, which provides an average of the demand value $Y(i)$ of "0" and a standard difference of "1" is calculated. Specifically, the standardized demand value $Yn(i)$ is calculated by dividing a value obtained by subtracting the average value from the demand value of each month by the standard deviation.

Next, the management computer 21 calculates component 1 (step S3-2). The component 1 is calculated by multiplying the standardized demand value $Yn(i)$ by a factor load amount 31 shown in FIG. 6 and then obtaining their total.

Next, the management computer 21 calculates component 2 (step S3-3). The component 2 is calculated by multiplying the standardized demand value $Yn(i)$ by a factor load amount 32 shown in FIG. 6 and then obtaining their total.

Figure 5:
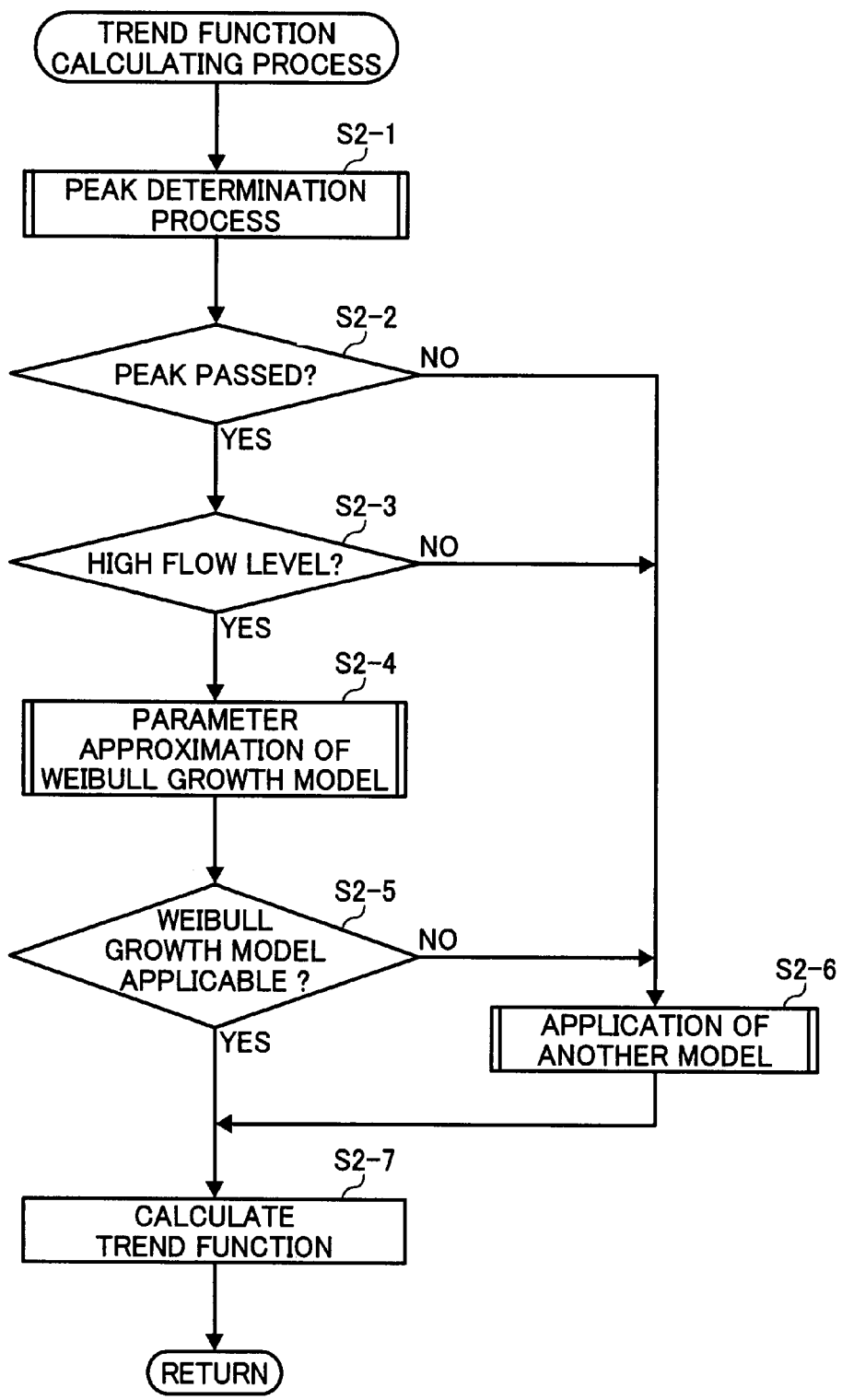
FIG. 5 is a flowchart of process procedures according to the embodiment.
Figure 6:
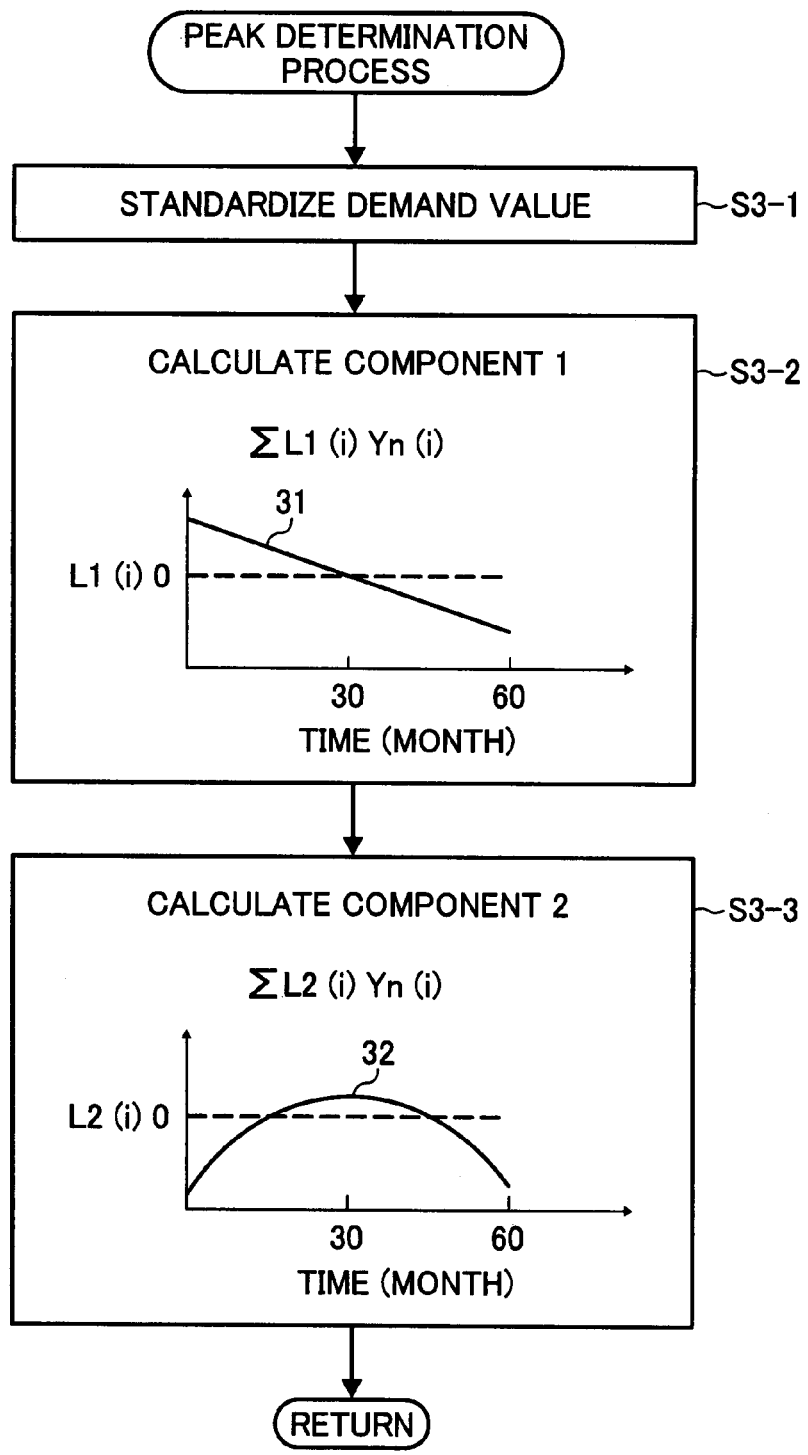
FIG. 6 is a flowchart of process procedures according to the embodiment.
Figure 7:
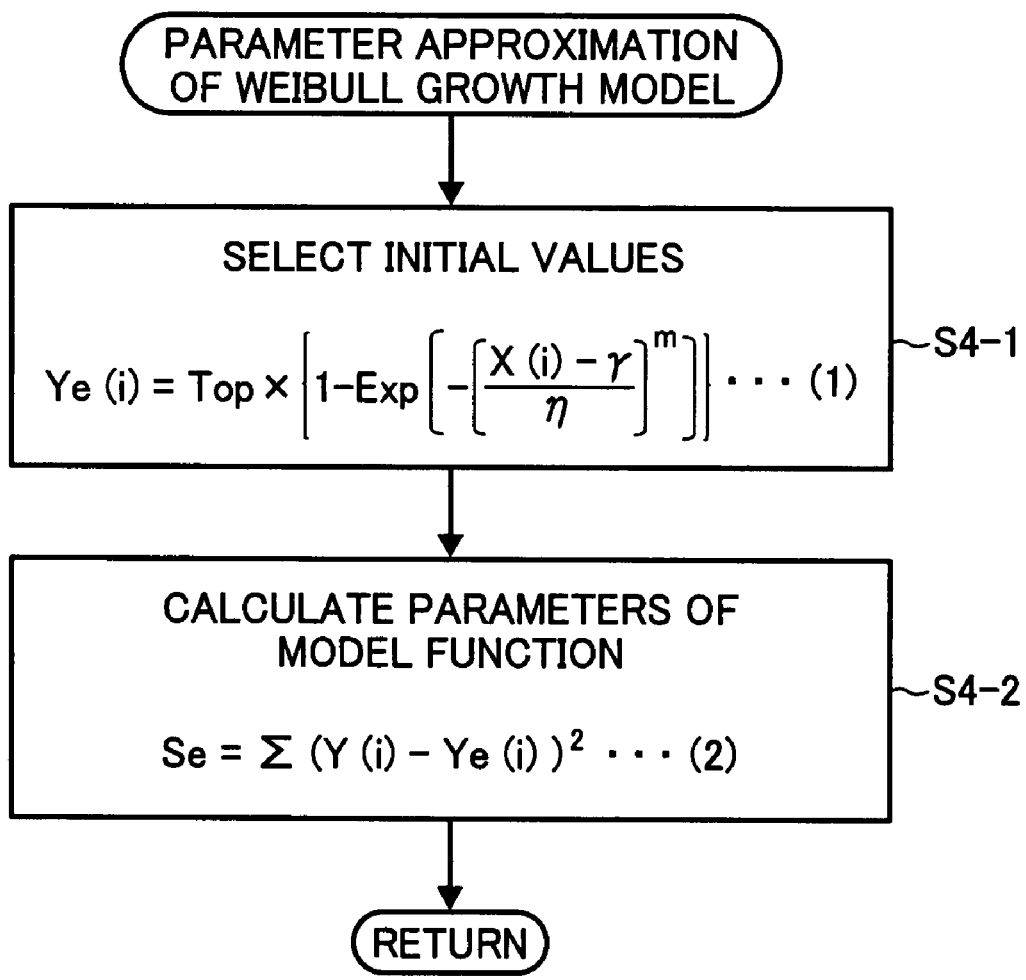
FIG. 7 is a flowchart of process procedures according to the embodiment.
Figure 8:
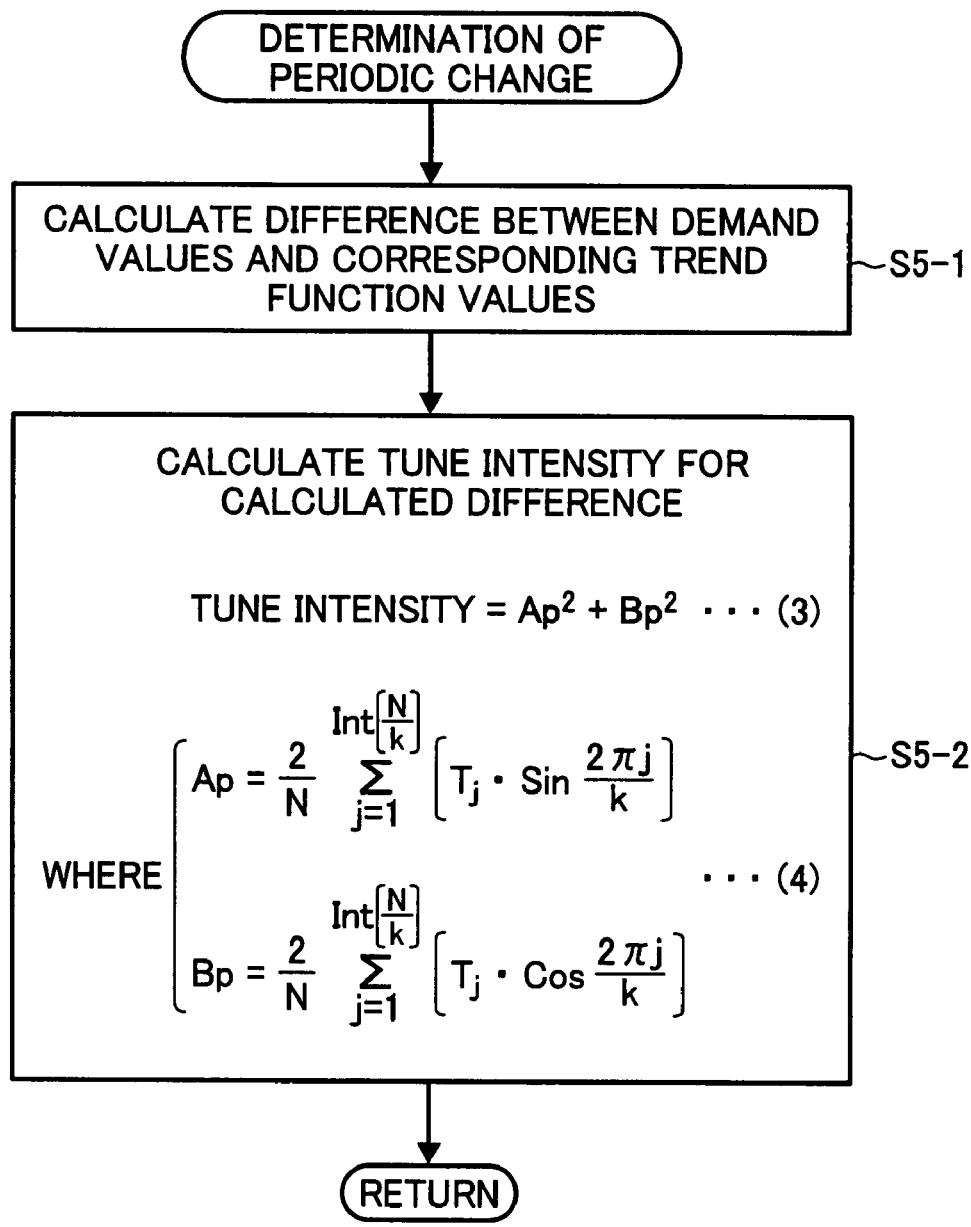
FIG. 8 is a flowchart of process procedures according to the embodiment.

When the factor load amount 31 shown in FIG. 6 is used as the factor load amount $L1(i)$, the component 1 shows an increase/decrease trend, and the component value of a service part which has a decreasing demand trend becomes larger while the component value of a service part which has an increasing demand trend becomes smaller. When the factor load amount 32 shown in FIG. 6 is used as the factor load amount $L2(i)$, the component 2 shows a concave/convex type trend, and the component value of a service part which has a convex type (mountain type) demand trend becomes larger. After calculation of the components 1 and 2, the flow returns to the process shown in FIG. 5.

Then, the management computer 21 compares a value of a function having the calculated components 1 and 2 as parameters, against a predetermined value to determine whether the peak has already passed (step S2-2). When the function value is greater than the predetermined value, it is determined that the demand trend of the service part has already passed the peak.

When it is determined that the demand trend of the service part has already passed the peak (step S2-2: YES), the management computer 21 performs a flowability determination to determine whether or not the flow level of the demand value of the service part is high (step S2-3). In the embodiment, flowability determination for a part is done by first, choosing a predetermined period of time from the demand period that shows the greatest flow. Then, the average of the demand values is calculated over the chosen period of time. This average is called the Max average. When the Max average is equal to or greater than a predetermined value, the management computer 21 determines that the flow level is high.

When the flow level is high (step S2-3: YES), the management computer 21 performs fitting using the Weibull growth model. The management computer 21 performs parameter approximation process of the Weibull growth model (step S2-4). The parameter approximation process will be described referring to FIG. 7. The Weibull growth model is an accumulated distribution of the Weibull distribution.

In this process, a plurality of initial values prepared in advance are used. The initial values are used as parameters of the model function of the Weibull growth model. The model function of the Weibull growth model is expressed by equation (1) shown in FIG. 7. In the equation "Ye(i)" is a forecast value of the accumulated demanded quantity, and "X(i)" is the number of months starting from the release month. "Top" is the upper limit of the accumulated value which is a forecast value of the total demanded quantity from the release month of a part to the termination thereof. "m" is a shape parameter which determines the shape of the accumulation trend. "η" is a scale parameter which estimates a point of about 63% of the accumulated total. "γ" is a position parameter for correcting the difference between a release time and the origin of a period to be used in demand forecasting.

First, the management computer 21 selects initial values (Top0, m0, η0, γ0) to be used in the process from the prepared initial values (step S4-1). Next, the management computer 21 calculates individual parameters in the model function of the Weibull growth model using the selected initial values (step S4-2). In the embodiment, the least square method is used to determine parameters which minimize the sum of squares (Se) of the difference between the demand value and a theoretical value obtained from the model function of the Weibull growth model. The sum of squares (Se) is expressed by equation (2) shown in FIG. 7. As the model function is non-linear to parameters to be estimated, the parameters are determined by using the numerical analysis scheme called the Newton-Raphson method. Specifically, starting with the selected initial values (Top0, m0, η0, γ0), an approximate solution which each parameter converges to, is acquired, using the differential coefficients of the sum of squares (Se). Then, a model function having the approximated solutions as parameters is used as an accumulation forecast function.

When there is no convergence, the management computer 21 selects another set of initial values and performs the calculation again. When a converged approximate solution is calculated, or when there is no convergence even with the use of all the initial values prepared, the flow returns to the process of FIG. 5.

In the process of FIG. 5, the process differs depending on whether the estimation process was possible using the Weibull growth model (step S2-5). When the approximate solution does not converge with the Weibull growth model applied (step S2-5: NO), the management computer 21 performs approximation using other models (step S2-6). In the embodiment, "accumulation quadratic model", "accumulation cubic model" and "accumulation biquadratic model" are used as other models. The "accumulation quadratic model", "accumulation cubic model" and "accumulation biquadratic model" are respectively the quadratic, cubic and biquadratic multiple regression models. In this process, like in the process of step S4-2, parameters of the model function are calculated using the least square method. The management computer 21 selects the optimal model from forecasting models. In this case, the model function that minimizes the difference between the model function and the demand values is used.

When it is determined that the demand trend of the service part has not yet passed the peak (step S2-2: NO) or when it is determined that the flow level is low (step S2-3: NO), the management computer 21 performs the aforementioned process of adapting other models (step S2-6).

When the application of the Weibull growth model provides an approximate solution (step S2-5: YES), the management computer 21 calculates a trend function using the Weibull growth model to which the calculated parameters are applied (step S2-7). In the process, the trend function is calculated by obtaining a differential of the model function specified in step S2-4 or step S2-6 to calculate the forecast demanded quantity for each month.

Accordingly, the management computer 21 performs a periodic-change determination process for determining whether or not there is a periodic change in the demand trend of a service part (step S1-4). The periodic-change determination process will be explained referring to FIG. 8. In the embodiment, the determination is made using a known Periodgram.

First, the management computer 21 calculates a difference trend from the difference between the demand trend and the trend function (step S5-1).

Next, the management computer 21 calculates a tune intensity for the calculated difference (step S5-2). The tune intensity in a 6-month period or 12-month period is calculated using an equation (3) shown in FIG. 8. In the Periodgram, a trigonometric function which fluctuates in a certain period ($\mu$) and actual data (residual error) are tuned. The statistic quantity obtained in this manner is called "tune intensity". When the actual data fluctuates in the period ($\mu$), the tune intensity becomes large, and when the actual data behaves quite different from the period ($\mu$), the tune intensity becomes small. The Shester test is used in checking the tune intensity. Specifically, when the tune intensity becomes greater than a significant point of 1%, it is determined that there is a periodicity and the largest one of such tune intensities is used as the period. Then, the flow returns to the process shown in FIG. 4.

When the tune intensity becomes greater than the significant point of 1% and it is determined that there is a periodicity (step S1-5: YES), the management computer 21 performs a process of applying a periodic-change model to forecast a seasonal change (step S1-6).

Figure 9:
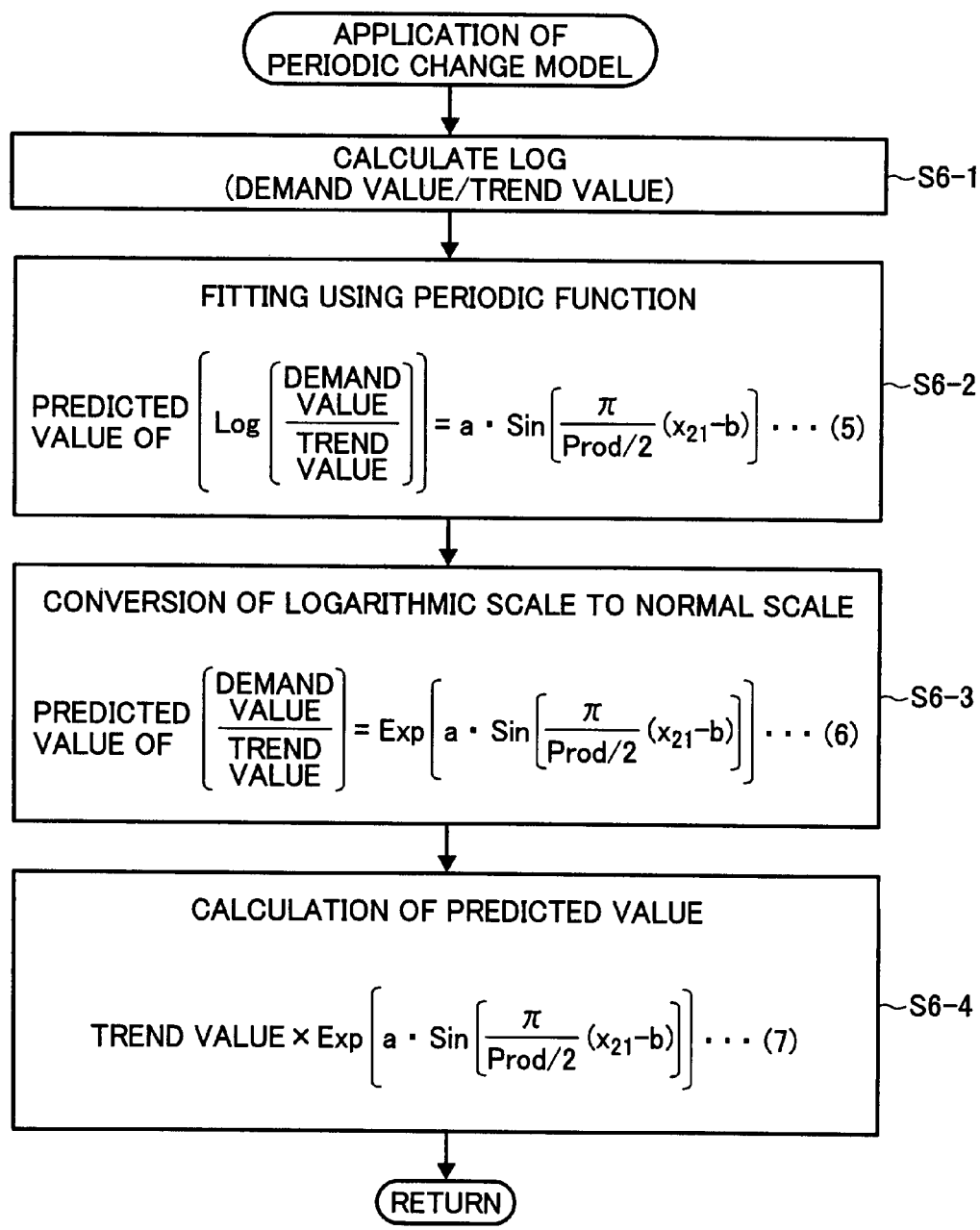
FIG. 9 is a flowchart of process procedures according to the embodiment.
Figure 10A:
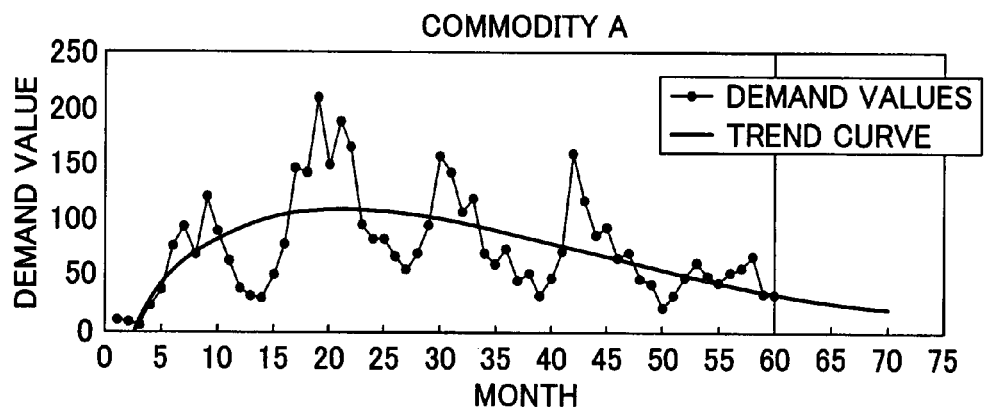
FIG. 10A is a graph showing the relationship between a demand trend and a trend function.
Figure 10B:
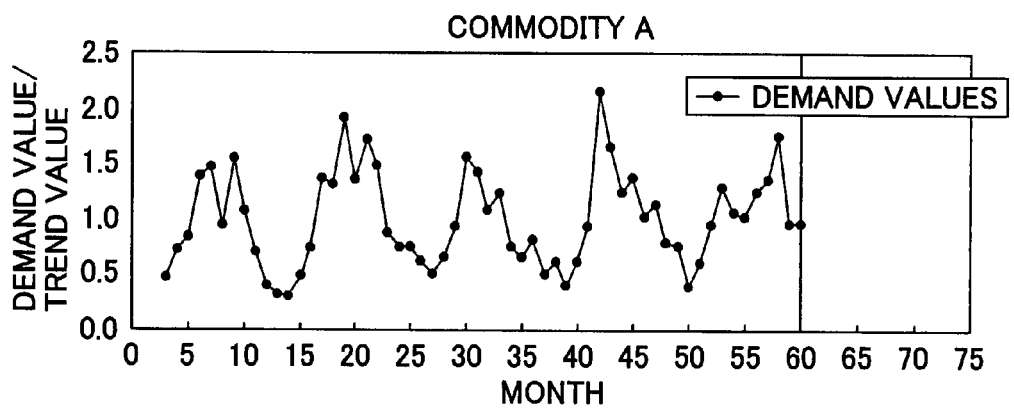
FIG. 10B is a graph showing the ratio of the demand trend to the trend function.
Figure 10C:
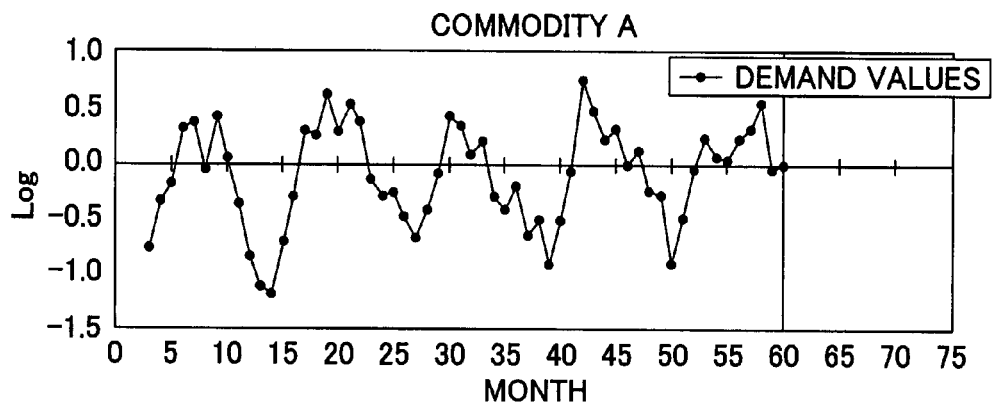
FIG. 10C is a graph showing a logarithm of the values of the graph shown in FIG. 10B.

This process will be described referring to FIG. 9. First, the management computer 21 calculates the ratio of the demand trend to the trend function (demand trend ratio), and calculates a logarithmic value thereof (step S6-1). In this case, with regard to a commodity A, it is assumed that a trend function with respect to a demand value is calculated as shown in FIG. 10A. As shown in FIG. 10B, the demand trend is divided by the trend function to calculate the demand trend ratio. The natural logarithm of the demand trend ratio is calculated, yielding what is shown in FIG. 10C.

Figure 11A:
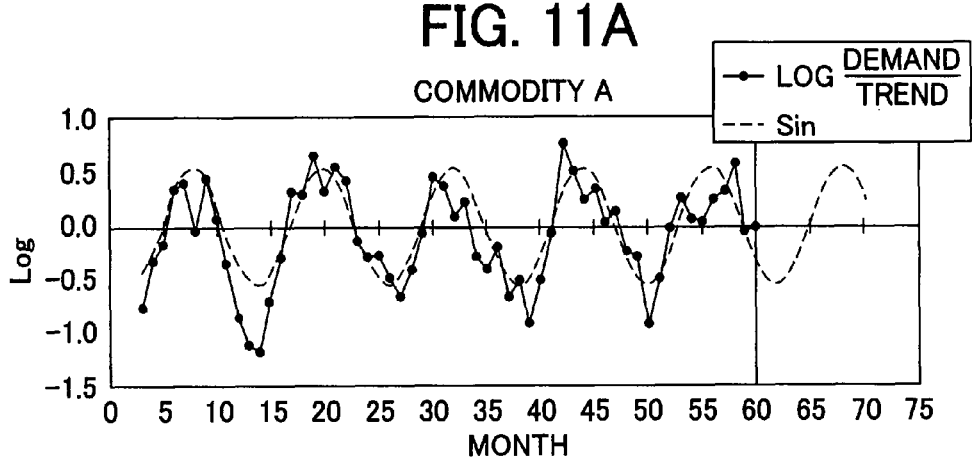
FIG. 11A is a graph showing the result of fitting the logarithm of the ratio of the demand trend to the trend function with a sine function.

Next, the management computer 21 performs fitting of the calculated natural logarithm of the demand trend ratio using the periodic function (step S6-2). In the embodiment, a "sine model" of an equation (5) shown in FIG. 9 is used as a model function of the periodic-change model. The "sine model" comprises only a trigonometric function. In the equation, "X(2i)" is a month from January to December. "ProD" is a period calculated using the Periodgram, and is "6" for a 6-month period and "12" for a 12-month period. "a" and "b" are parameters for fitting. Fitting is performed by changing the parameters. For example, fitting is performed to the natural logarithmic curve of the /demand trend ratio shown in FIG. 10C, the periodic function shown in FIG. 11A is acquired.

Figure 11B:
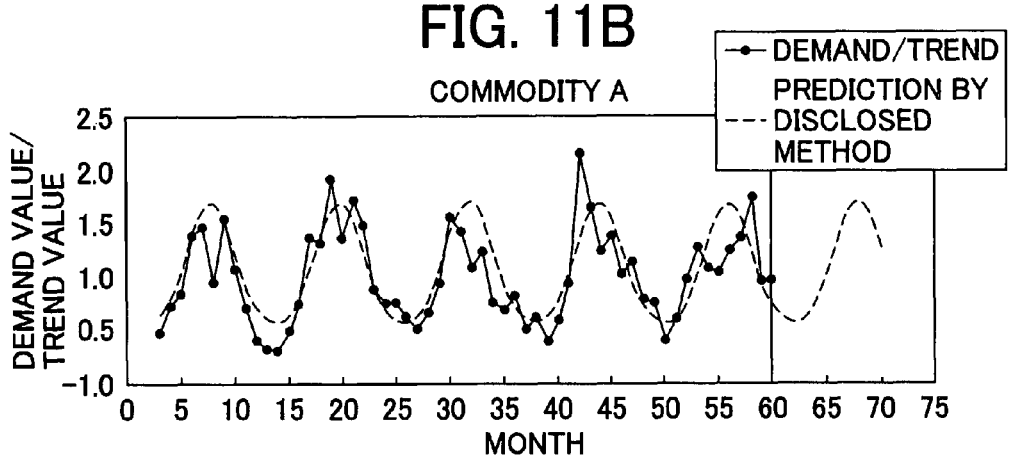
FIG. 11B is a graph showing the graph in FIG. 11A converted to a normal scale.

Next, the management computer 21 performs conversion of the logarithmic scale to the normal scale for the periodic function undergone fitting (step S6-3). Specifically, an exponent is calculated as indicated by equation (6) in FIG. 9 for the periodic function acquired in step S6-2. In this case, a periodic-change model of the normal scale shown in FIG. 11B is acquired.

Figure 11C:
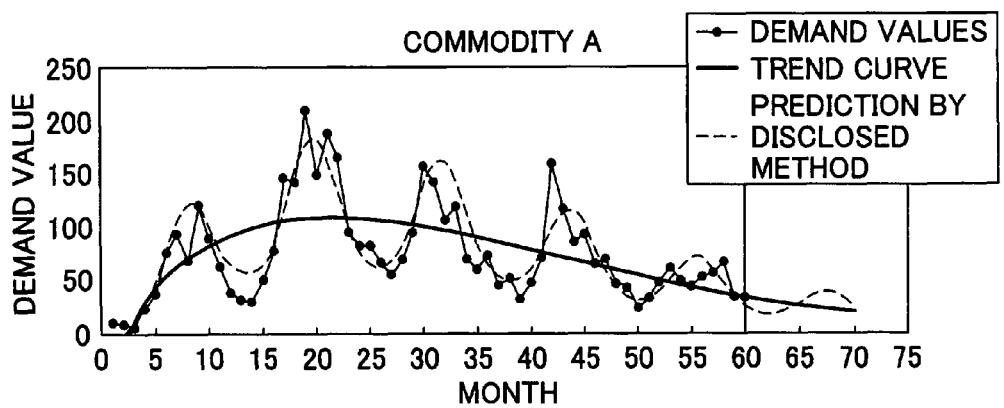
FIG. 11C is a graph showing the result of combining the values of the graph in FIG. 11B with the trend function.
Figure 12:
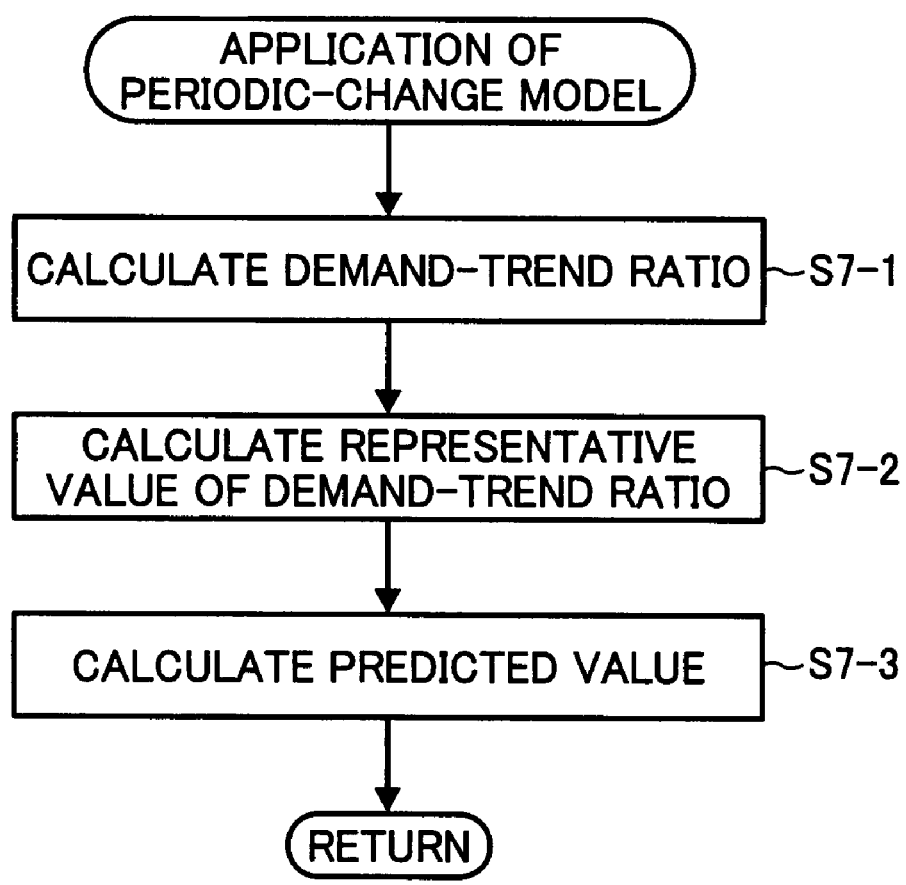
FIG. 12 is a flowchart of process procedures according to a second embodiment.

Then, the management computer 21 calculates a forecast value (step S6-4). Specifically, the periodic-change model of the normal scale acquired in step S6-3 and the trend function calculated in step S2-7 are combined to calculate a demand forecast value. For example, when the trend function shown in FIG. 10A is multiplied by the periodic model shown in FIG. 11B, the demand forecast result as indicated by a graph shown in FIG. 11C is acquired. When periodicity is found, a model obtained by multiplying the trend function by the periodic model is selected as a demand forecasting model.

When the process of applying the periodic-change model shown in FIG. 10 is finished, the flow returns to the process shown in FIG. 4. When it is determined that the tune intensity is small and there is no periodicity (step S1-5: NO), the process of step S1-6 is skipped and the trend function calculated in step S1-3 is used as the demand forecasting model.
(Process for Demand Period of Less than 18 Months)

When the demand period is less than 18 months (step S1-1: NO), the management computer 21 calculates the accumulation trend of demand values (step S1-7).

Next, the management computer 21 performs a process of applying a periodic-change model to forecast a seasonal change (step S1-8). In the embodiment, the "accumulation quadratic model", "6-month average model" and "12-month average model" are used. The "accumulation quadratic model", is the quadratic multiple regression model. The "6-month average model" is the average of demand values over the latest six months, and the "12-month average model" is the average of demand values over the latest twelve months.

Then, the management computer 21 performs a process of selecting the optimal model (step S1-9). In this process, the difference between the fitting result and the demand values is calculated, and a demand forecasting model which minimizes the difference is used.
(Output Process of Demand Forecasting)

Then, the management computer 21 forecasts a future demand value using the demand forecasting model selected in step S10-3, step S1-6 or step S1-9, and outputs the result to the order receiving system 10 over the network N (step S1-10). The service parts management division can give order instructions according to the demand forecast.

The demand forecasting process of the embodiment can provide the following advantages.

In the embodiment, the periodic-change model having a value obtained by dividing the demand trend by the trend function is used. Then, the trend function is multiplied by the calculated periodic model to calculate a demand forecasting model. Accordingly, the phenomenon that a large total demand quantity results in a large fluctuation can be reflected in the forecast value of the demand forecasting model.

In Unexamined Japanese Patent Application KOKAI Publication No. 2004-234471, the amplitude is adjusted using the quadratic function. However, the relationship between the demand value and the trend value changes nearly steadily regardless of the level of amplitude of the trend function. It is therefore unnecessary to adjust the amplitude using the quadratic function, and seasonal change can be expressed using a simple sine curve by using the demand trend ratio. This can relieve the calculation load and efficiently calculate a periodic-change model.

In the embodiment, the periodic model is applied to the logarithmic value of the demand trend ratio. In the normal scale, the demand trend ratio fluctuates in the vicinity of "1" when the difference between the demand value and the trend value is small. However, but when the difference between the demand value and the trend value is large, the amplitude of the demand trend ratio becomes smaller for when the demand value<trend value (value of "1" or smaller) than when demand value>trend value (value of "1" or greater). Therefore, the use of the logarithm better balances the level of amplitude around the x-axis, thus making it easier to express the demand trend ratio using the periodic function.

In the embodiment, the management computer 21 performs the periodic-change determination process to determine whether or not there is a periodic change in the demand trend of a service part. For example, there is a case where the use of a periodic-change model to a service part which does not have a periodic change, such as a seasonal change, causes the forecast to largely fail. This process can therefore ensure more adequate demand forecasting. While the use of the periodic-change model involves a calculation load, demand forecasting of a service part which does not have a periodic change can be executed efficiently without application of the periodic-change model.

In the embodiment, the management computer 21 determines whether or not periodicity is present using the Periodgram. This allows periodicity to be determined efficiently using the tune intensity.

In the embodiment, the management computer 21 performs demand forecasting of service parts using the Weibull growth model.

The Weibull distribution is not generally used in a growth model, but is widely used in estimating the product life in the field of reliability engineering. Therefore, the demands of service parts to be forecast are closely related to the field relating to the reliability of products, such as the product life and malfunction rate. It is thus possible to more adequately forecast the demands of service parts to maintain the functions of products.

In the embodiment, the management computer 21 performs demand forecasting of service parts using the Weibull growth model when the demand period is 18 months or longer. Because the Weibull growth model is the scheme of forecasting the next quantity demanded from past demand values, more adequate demand forecasting can be performed based on a predetermined demand period.

In the embodiment, the management computer 21 performs demand forecasting using the Weibull growth model when the demand trend of a service part passes the peak. The Weibull growth model draws the life cycle from the beginning of reception of an order for a service part to the end of the order reception. In this respect, the last accumulated amount (upper accumulation limit) is predicted. It is difficult to predict the upper accumulation limit unless the demand trend of the service part has dropped from the peak. If the Weibull growth model is applied to a part whose demand trend is increasing, the upper accumulation limit cannot be predicted, resulting in disabled analysis or providing a wrong peak. When the demand trend of a service part has passed the peak, therefore, demand forecasting can be executed more adequately by applying the Weibull growth model.

In the embodiment, the management computer 21 performs demand forecasting using the Weibull growth model when the flow level of a service part is high. Service parts have various demand trends; some service parts show a flowability of several ten thousands per month, while some other service parts show a flowability of one or two per month. The demand trend of a service part whose flow level is low is unstable and has large fluctuation, which may change the past demand trend. In this respect, the Weibull growth model is applied to those service parts whose demand trends are stable to thereby ensure more adequate demand forecasting.

(Second Embodiment)

A demand forecasting method, a demand forecasting program and a demand forecasting system according to the second embodiment of the invention will be described below referring to FIGS. 12 to 18. Because the second embodiment differs from the first embodiment in that the periodic-change model application process of the first embodiment is modified, detailed descriptions of those portions similar to the corresponding portions of the first embodiment will be omitted.

Figure 13:
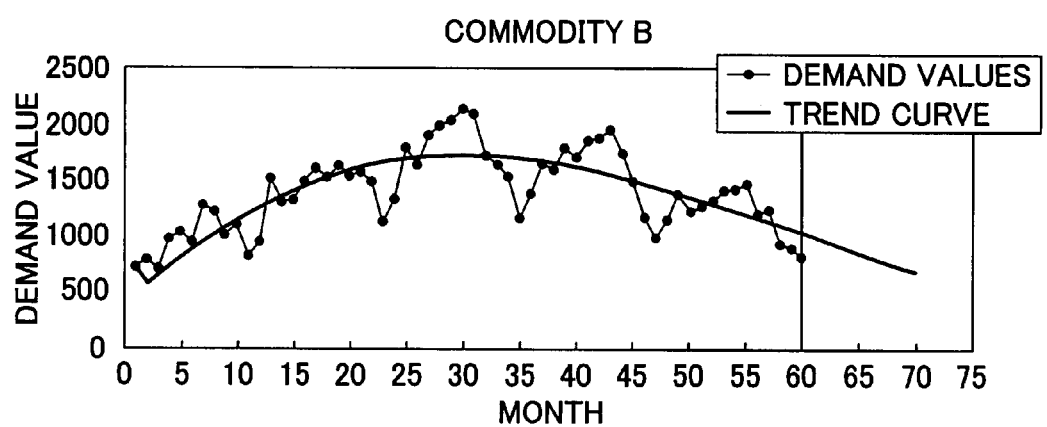
FIG. 13 is a graph showing the relationship between a demand trend and a trend function.
Figure 14:
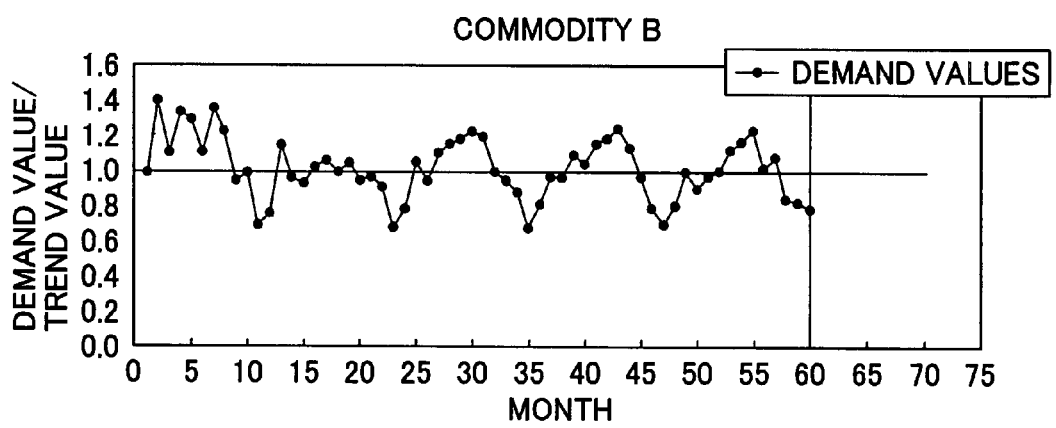
FIG. 14 is a graph showing the ratio of the demand trend to the trend function.

First, the management computer 21 calculates the ratio of the demand trend to the trend function (step S7-1). In this case, first, it is assumed that the trend function for a commodity B has been calculated as shown in FIG. 13. Then, the demand trend is divided by the trend function to calculate the demand trend ratio as shown in FIG. 14.

Figure 15:
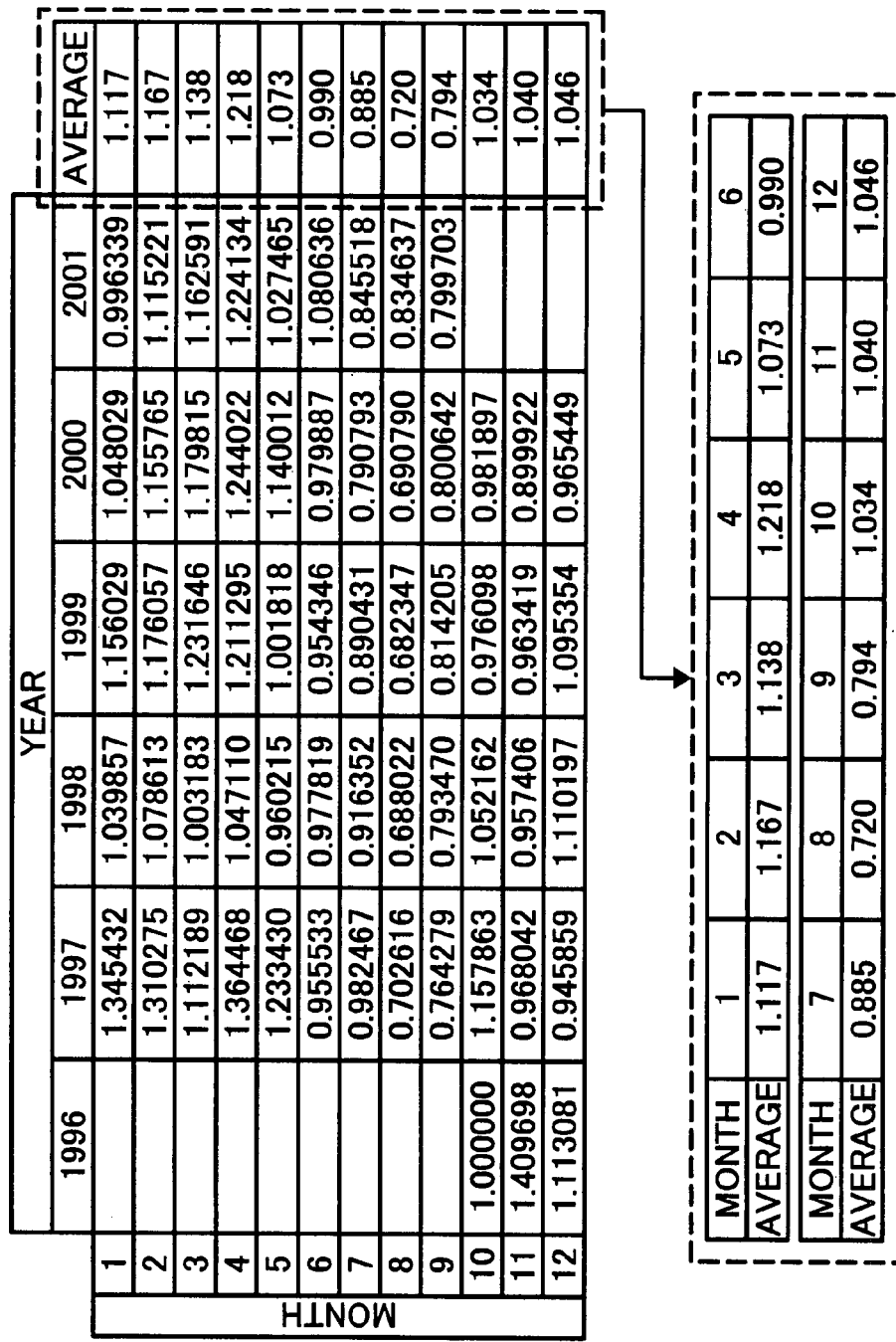
FIG. 15 is a monthly average table of a demand trend to be used in the second embodiment.

Then, the periodic-change model is calculated based on the statistic value representing the demand trend ratio (step S7-2). In this case, with a 12-month period assumed, the monthly average of the demand trend ratios over the past six years is calculated as the statistic value representing the demand trend ratio. Specifically, a table showing monthly demand trend ratio values of individual years, every 12 months in a row is prepared as shown in FIG. 15. Then, the monthly average value of the demand trend ratio values for each year is calculated. FIG. 16 shows the comparison of the average value with the demand trend ratio.

Figure 16A:
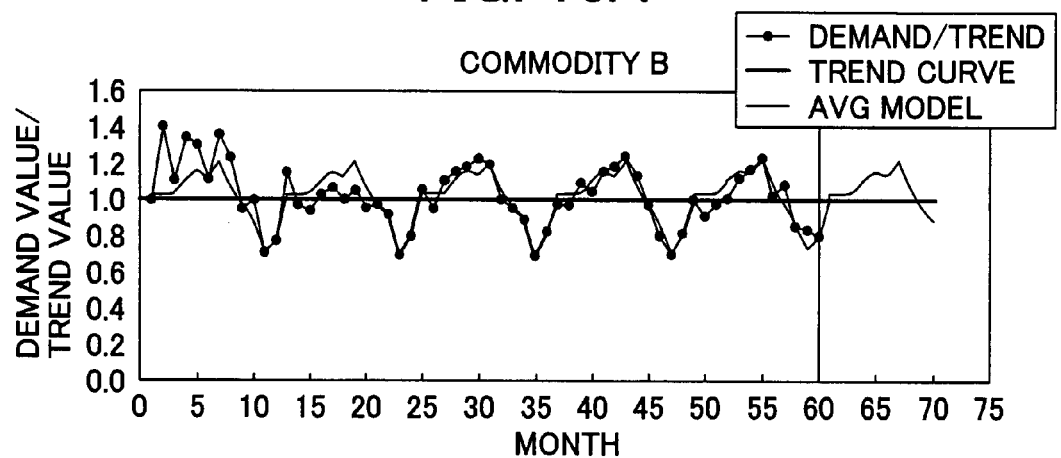
FIG. 16A is a graph showing a periodic change model to be acquired in the second embodiment.
Figure 16B:
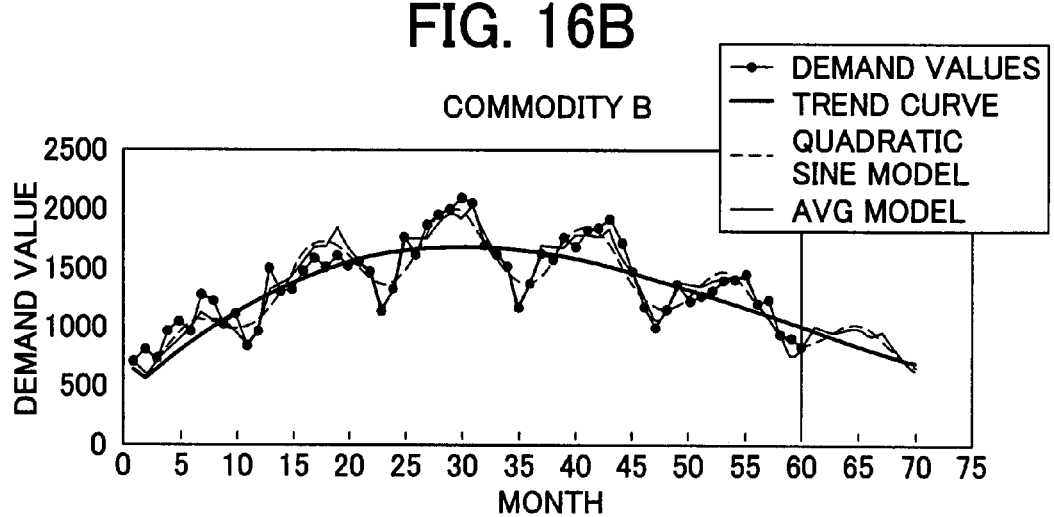
FIG. 16B is a graph showing the result of combining the values of the graph in FIG. 16A with the trend function.
Figure 17:
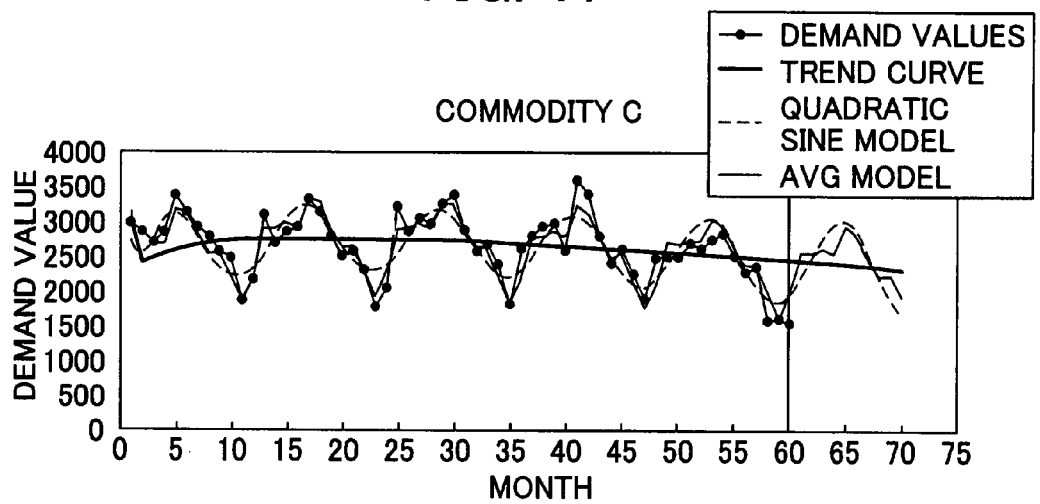
FIG. 17 is a graph showing the result of order reception forecasting to which the second embodiment is applied in a case where there are peaks in February and March and a drop in August.
Figure 18:
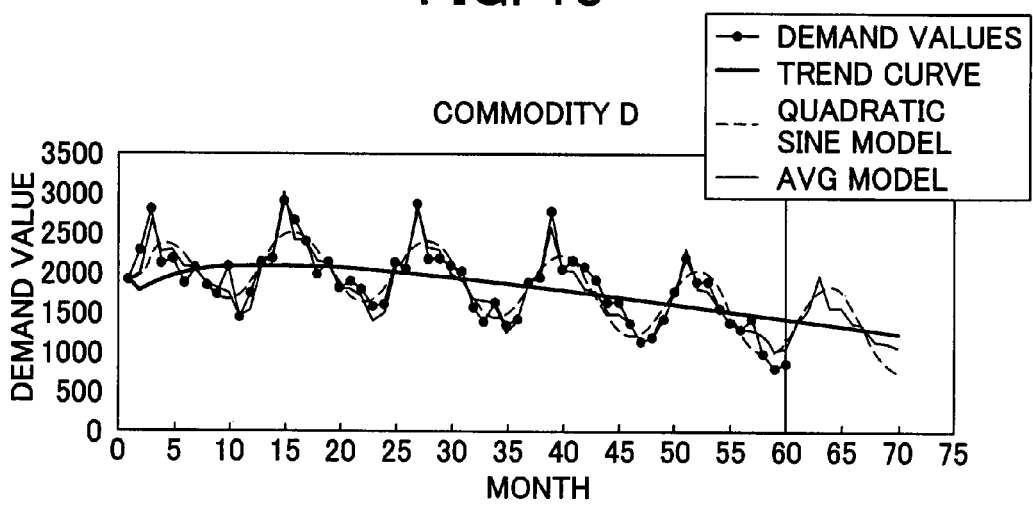
FIG. 18 is a graph showing the result of order reception forecasting to which the second embodiment is applied in a case where there is a peak in December.

Then, the management computer 21 calculates the forecast value (step S7-3). Specifically, the demand forecasting model is generated by multiplying the periodic-change model, acquired in step S7-2, by the trend function, calculated in step S2-7. For example, the curve representing the trend function shown in FIG. 13 is multiplied by the periodic-change model shown in FIG. 16A, the demand forecasting result as given by a graph shown in FIG. 16B is acquired.

Therefore, the second embodiment can provide the following advantage in addition to the advantages of the first embodiment.

In the second embodiment, the demand trend ratio is averaged monthly in calculating the periodic-change model. In some cases of seasonal changes, some service parts show unique features. For example, some service parts show the demand trends which protrude in certain months, or have similar repetitive peak shapes. Thus changes which cannot be expressed by the ordinary periodic function may be expressed using the model described in the second embodiment. Even for the curves representing the demand forecasting models shown in FIG. 17 and FIG. 18, better fitting can be obtained. While FIGS. 17 and 18 also show forecast curves using the quadratic sine model, it is apparent that the invention can realize better fitting.

The embodiments may be modified in the following manner.

Although demand forecasting of service parts is performed in the embodiments, the target of demand forecasting is not limited to service parts. Any commodities which may include a periodic change, such as a seasonal change, may be the target of demand forecasting.

In the first embodiment, the ratio of the demand value to the trend value is converted to a natural logarithm (Log). However, the base is not limited to the natural logarithm for any confirmed demand trend ratio whose center, with the logarithm taken, better balances the values of the demand trend ratio around the x-axis to become approximately symmetrical.

Figure 19:
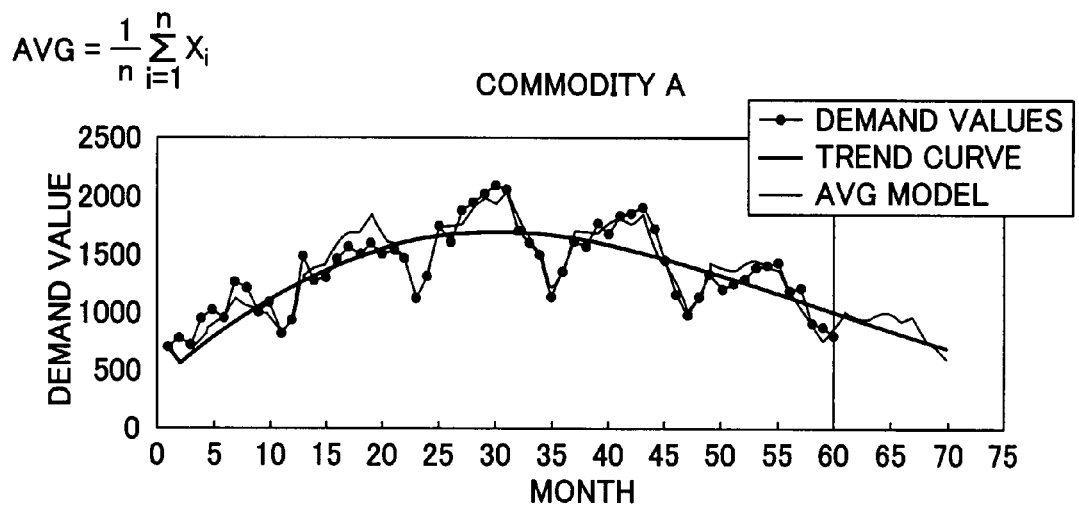
FIG. 19 is a graph showing the result of order reception forecasting to which the second embodiment is applied with the use of an average value
Figure 20:
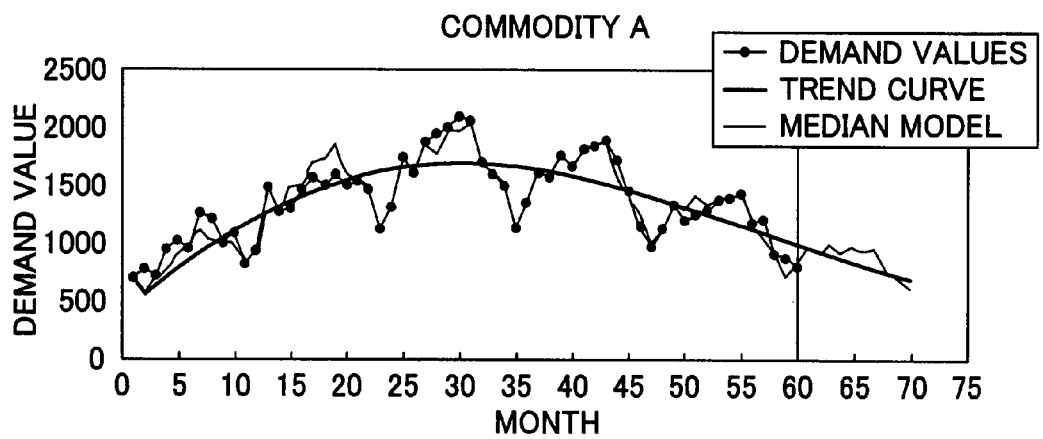
FIG. 20 is a graph showing the result of order reception forecasting to which the second embodiment is applied with the use of a median value.
Figure 21:
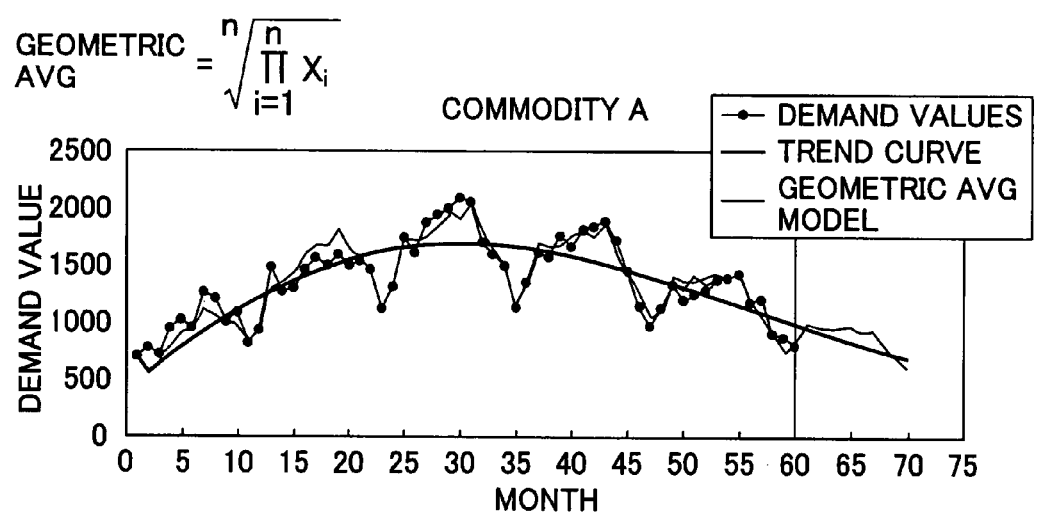
FIG. 21 is a graph showing the result of order reception forecasting to which the second embodiment is applied with a geometric average value being used as a statistic.
Figure 22A:
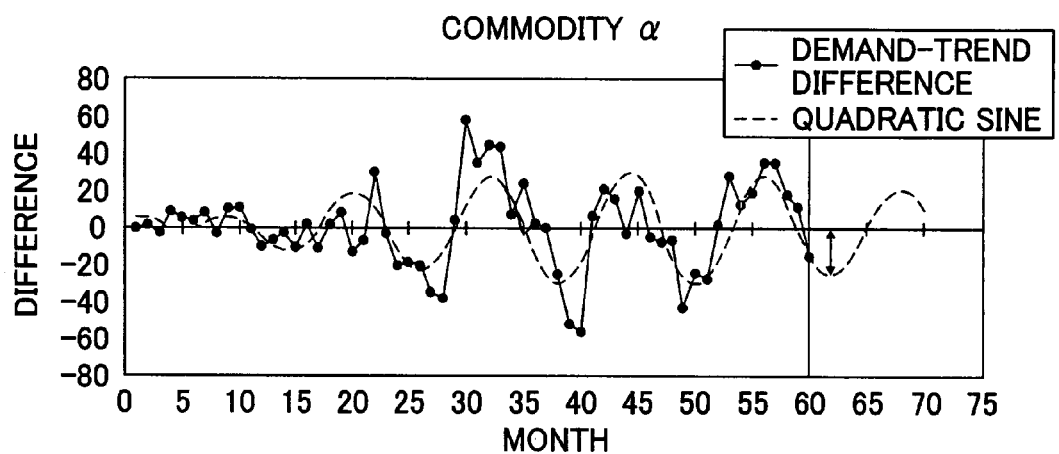
FIG. 22A is a graph showing the result of performing demand forecasting according to a conventional method, with a difference between a demanded quantity and a trend function being fitted with a periodic function.
Figure 22B:
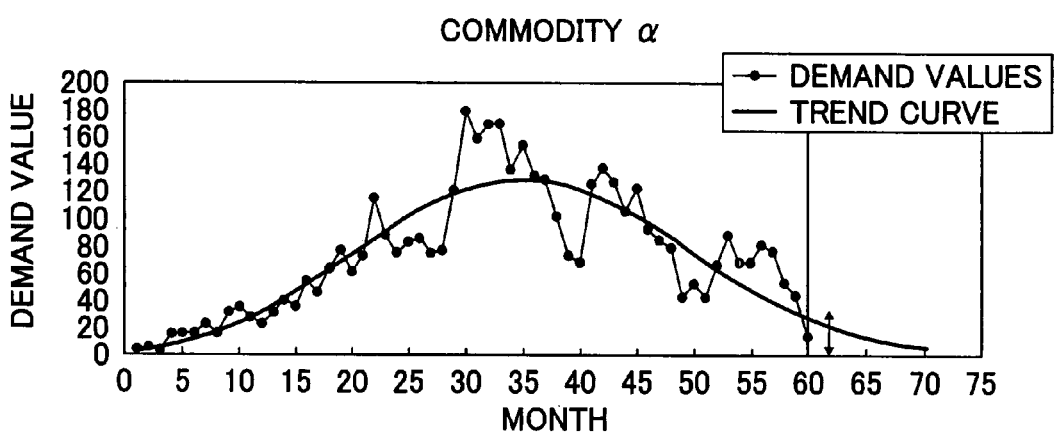
FIG. 22B is a graph showing the result of performing demand forecasting according to the conventional method, with a demanded quantity fitted with a trend function.
Figure 23A:
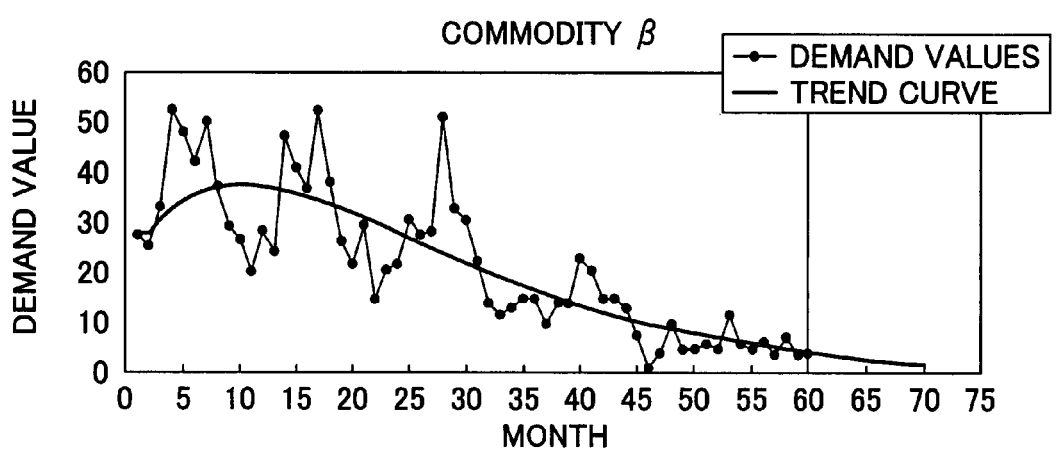
FIG. 23A is a graph showing the result of performing demand forecasting according to the conventional method and the result of fitting with a trend function.
Figure 23B:
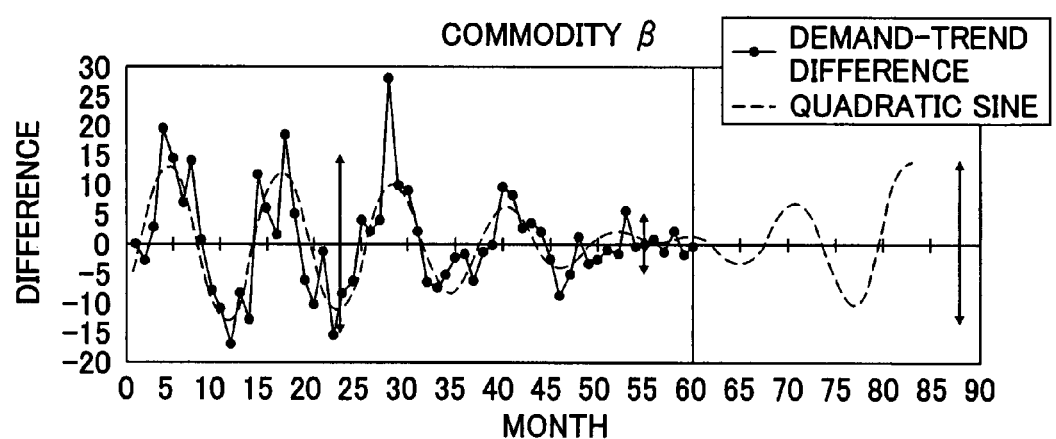
FIG. 23B is a graph showing the result of performing demand forecasting according to the conventional method and the result of fitting with a periodic function.
Figure 24:
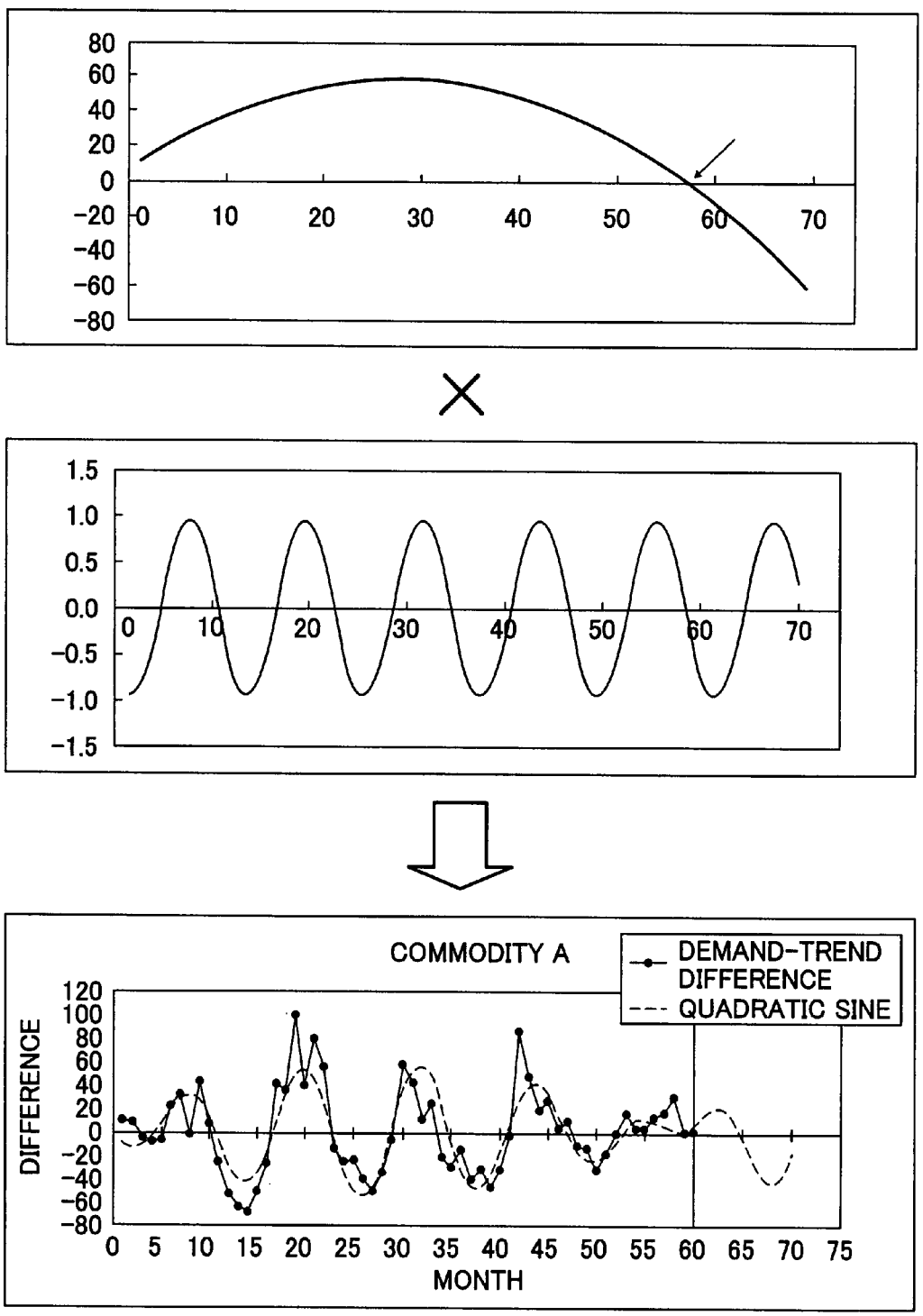
FIG. 24 is a graph showing the result of performing demand forecasting according to the conventional method.
Figure 25A:
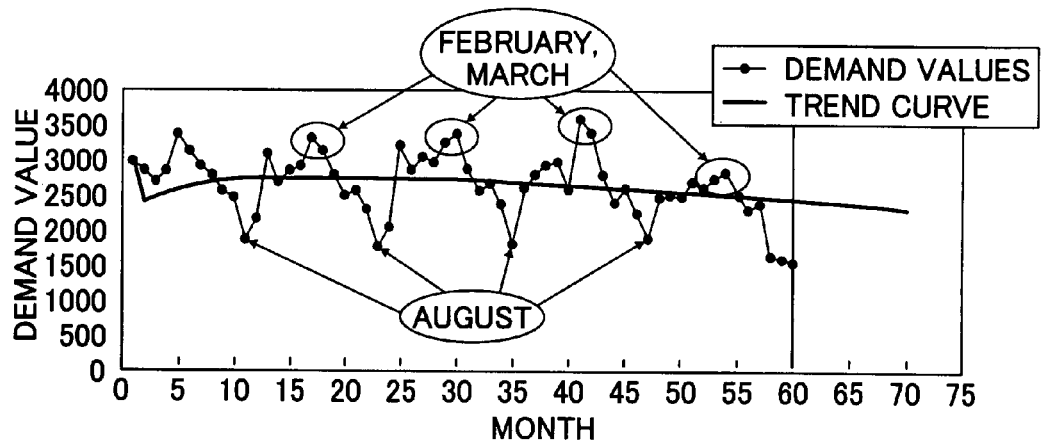
FIG. 25A is a graph showing the result of performing demand forecasting according to the conventional method in a case where there are peaks in February and March and a drop in August.
Figure 25B:
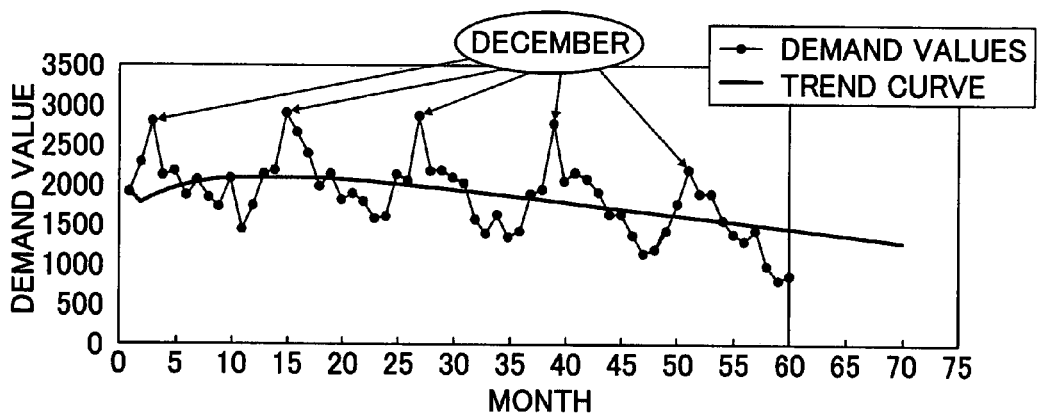
FIG. 25B is a graph showing the result of performing order forecasting according to the conventional method in a case where there is a peak in December.
Figure 25C:
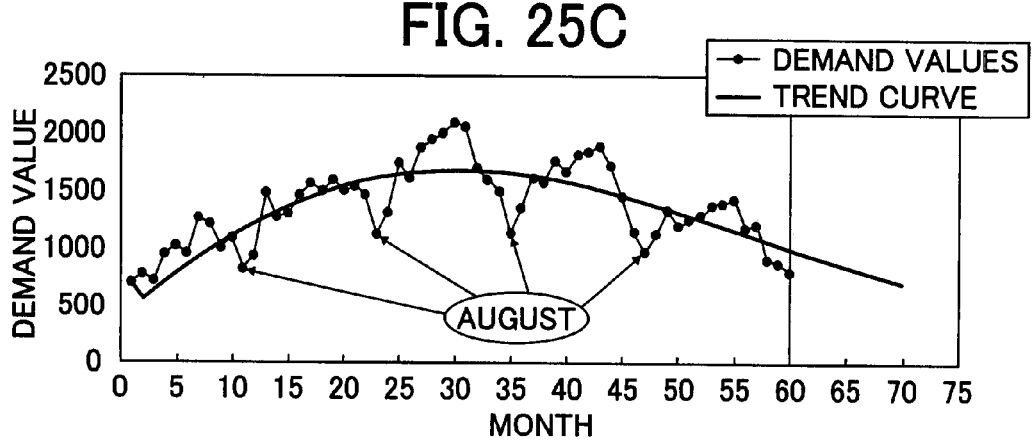
FIG. 25C is a graph showing the result of performing order forecasting according to the conventional method in a case where there is a drop in August.

Although the average of the ratio of the demand value to the trend value is used as the statistic value representing the demand trend ratio in the second embodiment, the average value is not restrictive. Any statistic index which can represent periodicity, e.g., the median value as shown in FIG. 20 or a geometric average value as shown in FIG. 21, can be used instead of the average value as shown in FIG. 19. In this case, as shown in FIG. 15, it is possible to calculate the statistic indexes for each demand value within a cyclic period and use those statistic indexes.

In the embodiments, the Weibull growth model is used in the process of calculating a trend curve. When the Weibull growth model cannot be applied, the trend function is calculated using the "accumulation quadratic model", "accumulation cubic model" and "accumulation biquadratic model". The calculation of the trend function is not limited to this particular method, and the management computer 21 may calculate a trend curve by using other growth models or part of those models.

In the second embodiment, the management computer 21 uses a period table of a 12-month period with respect to the calculated demand trend ratio. Instead of the table, a period table showing every periodicity from January to December or periodicities of months of divisors of 12 may be calculated. This can permit the demand for a commodity having a special period to be forecast.

Also, the above-described demand forecasting system 20 is provided with a program in the storage unit 213. However, the method for applying such a program is arbitrary. For example, the program may be applied to an arbitrary device by the program being provided through a communication medium such as the Internet, or may be distributed by storing the program in a predetermined recording medium (for example, a memory card, a CD-ROM, a DVD, etc.).

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-335531 filed on Nov. 21, 2005 and including specification, claims, drawings and summary. The disclosure of the above Japanese Patent Application is incorporated herein by reference in its entirety.

What is claimed is:

1. A demand forecasting apparatus comprising:
   a demand data storage which stores demand values of commodities in association with an identifier of each commodity;
   an accumulation trend calculator which calculates accumulation trend based on demand values stored in the demand data storage;
   a trend function calculator which calculates a trend function representing a demand trend based on the accumulation trend;

a periodic-change determinate which determines whether there is a periodic change in the demand trend or not based on the difference between the demand trend and the trend function;

a demand trend ratio calculator which calculates a demand trend ratio representing a ratio of the demand trend to the trend function;

a periodic-change model calculator which calculates a periodic-change model by calculating monthly average of the calculated demand trend ratio as static value;

a seasonal change forecaster which calculates a forecast value of seasonal change by combining the periodic-change model and the calculated trend function;

wherein the periodic-change model calculator comprises:

a logarithmic value calculator which calculates a natural logarithmic value of the demand trend ratio; and a periodic function fitter which performs fitting of the calculated natural logarithm of the demand trend ratio using a periodic function, and the periodic-change model calculator calculates the periodic-change model of a normal scale by converting the logarithm scale to a normal scale for the periodic function having undergone the fitting.

2. The demand forecasting apparatus according to claim 1, wherein the periodic function fitter uses a sine model as a model function of the periodic-change model.

3. The demand forecasting apparatus according to claim 1, wherein the seasonal change forecaster multiplies the periodic-change model of the normal scale by the calculated trend function to calculate the forecast value of the seasonal change.

4. The demand forecasting apparatus according to claim 1, wherein
the demand trend ratio calculator divides the demand trend by the trend function to calculate the demand trend ratio.

5. The demand forecasting apparatus according to claim 1, wherein
the trend function calculator uses a growth model to calculate the trend function.

6. The demand forecasting apparatus according to claim 1, wherein
the trend function calculator uses the Weibull growth model to calculate the trend function.

7. A computer-readable storage medium storing a program which causes a computer to function as:

an accumulation trend calculation unit which calculates accumulation trend based on demand values stored in a demand data storage which stores demand values of commodities in association with an identifier of each commodity;

a trend function calculation unit which calculates a trend function representing a demand trend based on the accumulation trend;

a periodic-change determination unit which determines whether there is a periodic change in the demand trend or not based on the difference between the demand trend and the trend function;

a demand trend ratio calculation unit which calculates a demand trend ratio representing a ratio of the demand trend to the trend function;

a periodic-change model calculation unit which calculates a periodic-change model by calculating monthly average of the calculated demand trend ratio as static value;

a seasonal change forecasting unit which calculates a forecast value of seasonal change by combining the periodic-change model and the calculated trend function;

wherein the periodic-change model calculator comprises:

a logarithmic value calculator which calculates a natural logarithmic value of the demand trend ratio; and a periodic function fitter which performs fitting of the calculated natural logarithm of the demand trend ratio using a periodic function, and the periodic-change model calculator calculates the periodic-change model of a normal scale by converting the logarithm scale to a normal scale for the periodic function having undergone the fitting.

* * * * *